United States Patent
Mori et al.

(10) Patent No.: US 9,053,858 B2
(45) Date of Patent: Jun. 9, 2015

(54) CAPACITOR, AND MANUFACTURING METHOD AND MANUFACTURING PROGRAM THEREOF

(71) Applicant: NIPPON CHEMI-CON CORPORATION, Tokyo (JP)

(72) Inventors: Masayuki Mori, Tokyo (JP); Tatsuo Kubouchi, Tokyo (JP); Takashi Nawano, Tokyo (JP); Akihiro Furusawa, Tokyo (JP); Junichirou Mukaeda, Tokyo (JP); Yasushi Kodama, Tokyo (JP); Shigeru Iizawa, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 73 days.

(21) Appl. No.: 13/768,851

(22) Filed: Feb. 15, 2013

(65) Prior Publication Data

US 2013/0155575 A1    Jun. 20, 2013

Related U.S. Application Data

(63) Continuation of application No. PCT/JP2011/004623, filed on Aug. 18, 2011.

(30) Foreign Application Priority Data

| Aug. 18, 2010 | (JP) | 2010-183486 |
| Nov. 9, 2010 | (JP) | 2010-251352 |
| Nov. 9, 2010 | (JP) | 2010-251353 |
| Nov. 9, 2010 | (JP) | 2010-251354 |
| Nov. 9, 2010 | (JP) | 2010-251355 |
| Nov. 9, 2010 | (JP) | 2010-251356 |
| Nov. 9, 2010 | (JP) | 2010-251357 |
| Nov. 9, 2010 | (JP) | 2010-251358 |
| Feb. 22, 2011 | (JP) | 2011-035484 |
| Jun. 30, 2011 | (JP) | 2011-145400 |

(51) Int. Cl.
*H01G 9/08* (2006.01)
*H01G 9/008* (2006.01)
(Continued)

(52) U.S. Cl.
CPC ............. *H01G 9/008* (2013.01); *H01G 9/016* (2013.01); *H01G 9/10* (2013.01); *H01G 9/145* (2013.01);
(Continued)

(58) Field of Classification Search
USPC ......... 361/517, 516, 518, 509–512, 525–529, 361/533–537
See application file for complete search history.

(56) References Cited

U.S. PATENT DOCUMENTS 6,064,563 A * 5/2000 Yamada et al. ............... 361/521
6,222,720 B1 4/2001 Aoki et al.
(Continued)

FOREIGN PATENT DOCUMENTS

| CN | 1701402 A | 11/2005 |
| DE | 10041369 A1 | 8/2001 |

(Continued)

OTHER PUBLICATIONS

Translation of the International Preliminary Report on Patentability (PCT/ISA/237) (7 pages), (PCT/IB/373) (1 page) of International Application No. PCT/JP2011/004623 mailed Mar. 28, 2013 (Form PCT/IB/338) (1 page).

(Continued)

*Primary Examiner* — Nguyen T Ha
(74) *Attorney, Agent, or Firm* — Westerman, Hattori, Daniels & Adrian, LLP

(57) ABSTRACT

A capacitor includes: an anode part that is drawn from an anode body of a capacitor element to an element end-face, to be formed over the element end-face; a cathode part that is drawn from a cathode body of the capacitor element to the element end-face, to be formed over the element end-face; an anode terminal member that is disposed in a sealing member; a cathode terminal member that is disposed in the sealing member; an anode current collector plate that is connected to the anode part, and is also connected to the anode terminal member; and a cathode current collector plate that is connected to the cathode part, and is also connected to the cathode terminal member.

20 Claims, 27 Drawing Sheets

(51) Int. Cl.
*H01G 9/10* (2006.01)
*H01G 9/145* (2006.01)
*H01G 11/28* (2013.01)
*H01G 11/74* (2013.01)
*H01G 11/82* (2013.01)
*H01G 11/84* (2013.01)
*H01G 13/00* (2013.01)

(52) U.S. Cl.
CPC .............. *H01G 11/28* (2013.01); *H01G 11/74* (2013.01); *H01G 11/82* (2013.01); *H01G 11/84* (2013.01); *H01G 13/00* (2013.01); *Y02E 60/13* (2013.01)
USPC ........... 361/517; 361/516; 361/518; 361/535; 361/536; 361/537

(56) References Cited

U.S. PATENT DOCUMENTS

| | | | |
|---|---|---|---|
| 6,292,348 | B1 * | 9/2001 | Lin ........................... 361/301.3 |
| 6,456,484 | B1 | 9/2002 | Matsuoka et al. |
| 6,896,993 | B2 | 5/2005 | Hozumi et al. |
| 7,286,335 | B2 | 10/2007 | Hozumi et al. |
| 7,830,647 | B2 * | 11/2010 | Miura et al. ................. 361/518 |
| 7,916,454 | B2 * | 3/2011 | Shimizu et al. .............. 361/521 |
| 7,948,738 | B2 * | 5/2011 | Shimamoto et al. ......... 361/502 |
| 8,164,882 | B2 * | 4/2012 | Sakata et al. ................. 361/519 |
| 8,780,528 | B2 * | 7/2014 | Takagi et al. ................ 361/502 |
| 2002/0195432 | A1 | 12/2002 | Sekiguchi |
| 2006/0034036 | A1 | 2/2006 | Miura et al. |
| 2009/0109600 | A1 | 4/2009 | Reddy et al. |

FOREIGN PATENT DOCUMENTS

| | | |
|---|---|---|
| DE | 112004000061 T5 | 9/2005 |
| DE | 69834706 T2 | 6/2007 |
| EP | 0924723 A2 | 6/1999 |
| JP | 06-275476 A | 9/1994 |
| JP | 6-275476 A | 9/1994 |
| JP | 08-007882 | 1/1996 |
| JP | 08-287954 A | 11/1996 |
| JP | 10-083833 A | 3/1998 |
| JP | 11-219857 A | 8/1999 |
| JP | 11-251190 A | 9/1999 |
| JP | 2001-068379 A | 3/2001 |
| JP | 2001-102031 A | 4/2001 |
| JP | 2002-164259 A | 6/2002 |
| JP | 2003-1452 A | 1/2003 |
| JP | 2003-059765 A | 2/2003 |
| JP | 2007-335150 A | 12/2007 |
| JP | 2007-335156 A | 12/2007 |
| JP | 2009-188095 A | 8/2009 |
| JP | 2010-093178 A | 4/2010 |
| JP | 2010-118374 A | 5/2010 |
| KR | 10-2005-0113592 A | 12/2005 |
| WO | 01/024206 A1 | 4/2001 |
| WO | 2004/084246 A1 | 9/2004 |
| WO | 2005/038837 A1 | 4/2005 |
| WO | 2010/041461 A1 | 4/2010 |
| WO | 2012/063486 A1 | 5/2012 |

OTHER PUBLICATIONS

International Search Report of PCT/JP2011/004623, mailing date of Nov. 15, 2011.
Written Opinion PCT/JP2011/004623, mailing date of Nov. 15, 2011.
Japanese Office Action dated Oct. 22, 2013, issued in corresponding Japanese Application No. 2010-183486, w/ English Translation. (6 pages).
Japanese Office Action dated Sep. 2, 2014, issued in correponding JP application No. 2010-251352 with English translation (8 pages).
Japanese Office Action dated Jul. 29, 2014, issued in correponding JP application No. 2010-251353 with English translation (4 pages).
Japanese Office Action dated Dec. 2, 2014, issued in corresponding Japanese Patent Application No. 2010-251355, w/English translation (4 pages).
Japanese Office Action dated Dec. 2, 2014, issued in corresponding Japanese Patent Application No. 2010-251356, w/English translation (5 pages).
Japanese Office Action dated Dec. 2, 2014, issued in corresponding Japanese Patent Application No. 2010-251357, w/English translation (5 pages).
Japanese Office Action dated Dec. 2, 2014, issued in corresponding Japanese Patent Application No. 2010-251358, w/English translation (6 pages).
Japanese Office Action dated Jan. 13, 2015, issued in corresponding Japanese Patent Application No. 2010-251358, w/English translation (6 pages).
Japanese Office Action dated Mar. 24, 2015, issued in corresponding Japanese Patent Application No. 2010-251353, with English Translation (4 pages).
Chinese Office Action dated Feb. 9, 2015, issued in corresponding Chinese Patent Application No. 201180039963.7, with English translation (19 pages).

* cited by examiner

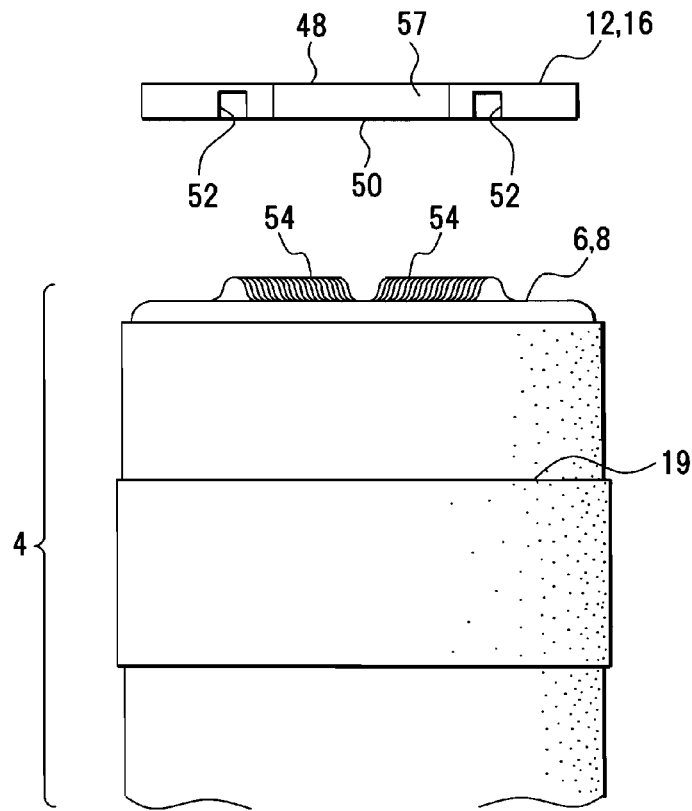
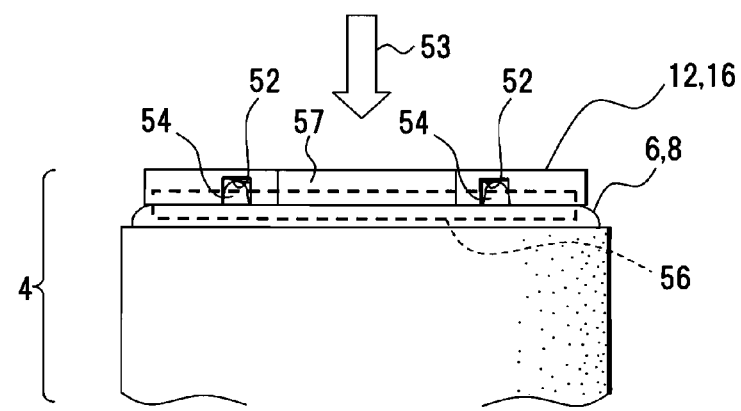
FIG. 6A
FIG. 6B

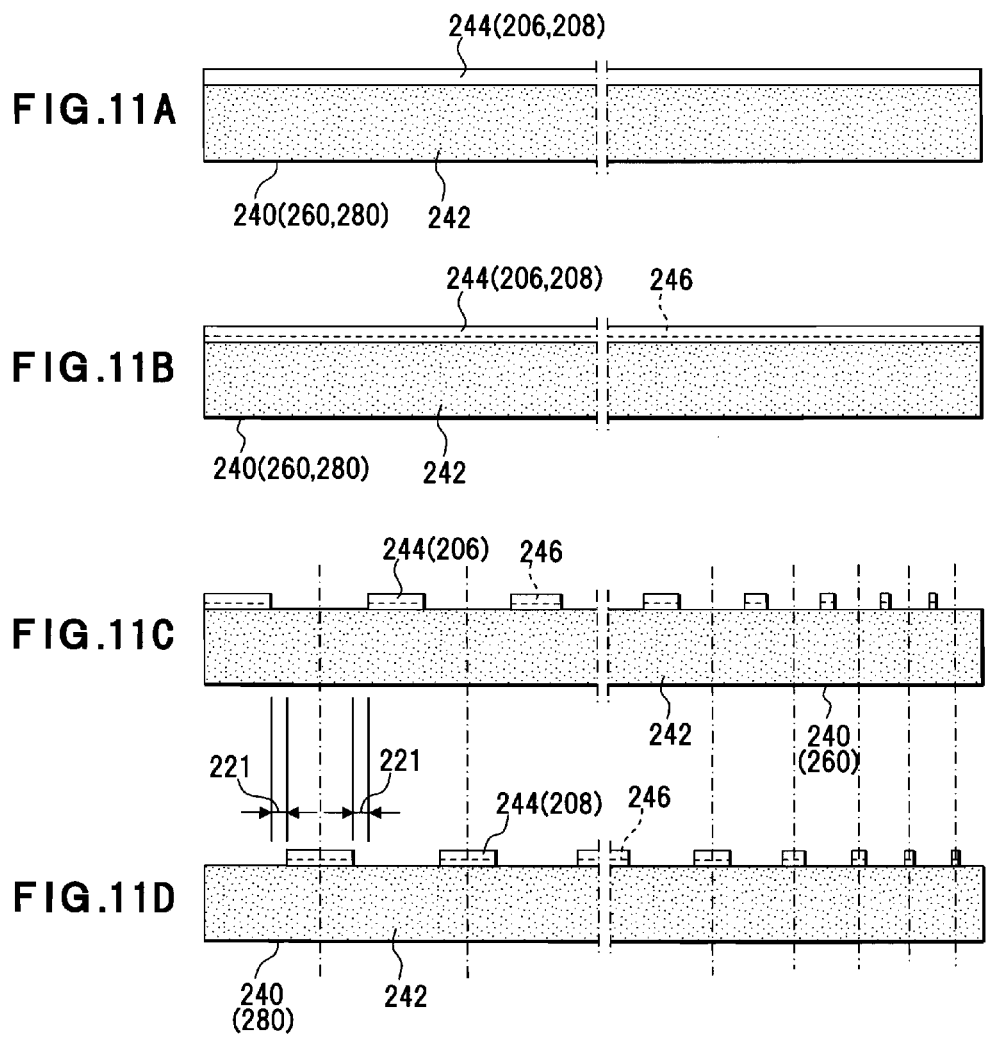

CAPACITOR, AND MANUFACTURING METHOD AND MANUFACTURING PROGRAM THEREOF

CROSS-REFERENCE TO RELATED APPLICATIONS

This application is a continuation of International Application No. PCT/JP2011/004623, filed on Aug. 18, 2011, which is entitled to the benefit of priority of Japanese Patent Application No. 2010-183486, filed on Aug. 18, 2010, Japanese Patent Application No. 2010-251358, filed on Nov. 9, 2010, Japanese Patent Application No. 2010-251357, filed on Nov. 9, 2010, Japanese Patent Application No. 2010-251356, filed on Nov. 9, 2010, Japanese Patent Application No. 2010-251355, filed on Nov. 9, 2010, Japanese Patent Application No. 2010-251354, filed on Nov. 9, 2010, Japanese Patent Application No. 2010-251353, filed on Nov. 9, 2010, Japanese Patent Application No. 2010-251352, filed on Nov. 9, 2010, Japanese Patent Application No. 2011-035484, filed on Feb. 22, 2011, and Japanese Patent Application No. 2011-145400, filed on Jun. 30, 2011, the contents of which are hereby incorporated by reference.

BACKGROUND OF THE INVENTION i) Field of the Invention

The present invention relates to connection between capacitor elements and external terminals, and for example, relates to capacitors such as electrolytic capacitors and electric double layer capacitors, and manufacturing methods and manufacturing programs of the capacitors.

ii) Description of the Related Art

It is necessary to electrically connect elements and external terminals in electric double layer capacitors or electrolytic capacitors. Such electrical connection provides reduced internal resistance for elements and reduced contact resistance for connecting portions.

Concerning such electrical connection, the following are known: to provide current collector terminals for the end-faces of an element (for example, Japanese Patent Application Laid-Open Publication No. H11-219857); to provide an anode current collector plate for one end-face of a wound element, and a cathode current collector plate for the other end-face (for example, Japanese Patent Application Laid-Open Publication No. 2001-068379); to provide current collector plates so that the current collector plates cover current collector foil which is bare over the end-faces of a wound element, and to connect the current collector plates and the current collector foil by welding (for example, Japanese Patent Application Laid-Open Publication No. 2007-335156); and to use current collector plates for connection to an encapsulating case and an element and connection with an external terminal (for example, Japanese Patent Application Laid-Open Publication No. 2010-093178).

BRIEF SUMMARY OF THE INVENTION

In the structure of providing a current collector for each end-face of a winding element, it is necessary to ensure connection distance between an external terminal and a current collector if the external terminal of each anode and cathode side is adjacently placed in an outer packaging member that covers the outside of a wound element. Also, distribution of the internal resistance is different between the inner and outer sides of a winding element. Thus, countermeasures against this need to be taken, and it is necessary to pay attention to connection between an element and a current collector. The structure of using a current collector can reduce the internal resistance of an element. In the middle of the manufacture, stress that is applied to the current collector which intervenes between an external terminal and the element may affect connection so as to reduce the reliability of the connection and/or make connection resistance high.

It is also necessary to connect the same polarities when a current collector and a capacitor element are connected or a current collector and an external terminal are connected. Polarity discrimination by visual inspection is trouble in the manufacture, and reduces the productivity.

As to the above requests and problems, there is no disclosure or suggestion, and there is no disclosure or suggestion as to structures for solving Japanese Patent Application Laid-Open Publication No. H11-219857, Japanese Patent Application Laid-Open Publication No. 2001-068379, Japanese Patent Application Laid-Open Publication No. 2007-335156, and Japanese Patent Application Laid-Open Publication No. 2010-093178.

It is therefore an object of the present invention to achieve reduction of the resistance, a robust connection structure, and simplification of the connecting steps of capacitors in view of the above problems.

It is another object of the present invention to achieve automation of connection between current collector members and element end-faces in view of the above problems.

It is yet another object of the present invention to automate polarity discrimination of current collector members and element end-faces in view of the above problems.

It is yet another object of the present invention to automate determination of defective capacitor elements in view of the above problems.

According to an aspect of the embodiments, a capacitor includes a capacitor element that is made by winding or laminating an anode body and a cathode body, between which a separator is sandwiched; a sealing member that seals an opening of the case member, which accommodates the capacitor element; an anode part that is drawn from the anode body of the capacitor element to an element end-face, to be formed over the element end-face; a cathode part that is drawn from the cathode body of the capacitor element to the element end-face, to be formed over the element end-face; an anode terminal member that is disposed in the sealing member; a cathode terminal member that is disposed in the sealing member; an anode current collector plate that is connected to the anode part, and is also connected to the anode terminal member; and a cathode current collector plate that is connected to the cathode part, and is also connected to the cathode terminal member.

In the above capacitor, preferably, the anode terminal member may be superposed on the anode current collector plate to weld side face parts of the anode terminal member and the anode current collector plate, or the cathode terminal member may be superposed on the cathode current collector plate to weld side face parts of the cathode terminal member and the cathode current collector plate.

In the above capacitor, preferably, a single or a plurality of electrode protrusion part(s) may constitute the anode part or the cathode part, the electrode protrusion part(s) being drawn from one or both of electrode bodies, which include the anode body and the cathode body, to the element end-face of the capacitor element, the electrode protrusion part(s) being folded and superposed over the element end-face of the capacitor element along predetermined distance from the element end-face as a fold.

Preferably, the above capacitor may further include a connecting plate that is placed between the anode current collector plate and the anode terminal member, is connected to the anode terminal member, and is also connected to the anode current collector plate, or a connecting plate that is placed between the cathode current collector plate and the cathode terminal member, is connected to the cathode terminal member, and is also connected to the cathode current collector plate In the above capacitor, preferably, the anode part or the cathode part may be arranged over the element end-face of the capacitor element by drawing part of electrode bodies, which include the anode body and the cathode body, to the element end-face of the capacitor element and folding the part of the electrode bodies, the part of the electrode bodies having predetermined protruding width, and an isolation distance that is set between the anode part and the cathode part is set wider than the protruding width of the electrode bodies.

In the above capacitor, preferably, an isolation distance that is set between the anode current collector plate and the cathode current collector plate may be narrower than an isolation distance that is set between the anode part and the cathode part.

In the above capacitor, preferably, the anode current collector plate may be placed between the anode part and the anode terminal member, a first connecting area and a second connecting area may be set in different positions on the anode current collector plate, the anode part may be connected to the first connecting area, and the anode terminal member may be connected to the second connecting area, or the cathode current collector plate may be placed between the cathode part and the cathode terminal member, the first connecting area and the second connecting area may be set in different positions on the cathode current collector plate, the cathode part may be connected to the first connecting area, and the cathode terminal member may be connected to the second connecting area.

In the above capacitor, preferably, one of the current collector plates may be placed over the element end-face of the capacitor element, be connected to the anode part or the cathode part, and have a first connecting face that is arcuate in a side face direction of the capacitor element, the anode terminal member or the cathode terminal member may have a second connecting face, which is concentric with the first connecting face of the current collector plate, and the first connecting face and the second connecting face may be welded to connect the current collector plate and the anode terminal member, or to connect the current collector plate and the cathode terminal member.

In the above capacitor, preferably, each of the anode part and the cathode part may be formed by an electrode protrusion part that is drawn from the element end-face, a shape or an area of an end-face of the electrode protrusion part being varied between an anode side and a cathode side, or by molding the electrode protrusion part, to have a different shape or area of an end-face of each of the anode part and the cathode part, and the current collector plate may be identified as the anode side or the cathode side by the shape or the area of the end-face of the electrode protrusion part, or by the shape or the area of the end-face of the anode part or the cathode part.

In the above capacitor, preferably, the shape or the area of the current collector plate may be varied between the anode side and the cathode side, the anode side or the cathode side of the current collector plate may be identified by the shape or the area, and the current collector plate may be connected to the external terminal.

According to an aspect of the embodiments, a capacitor manufacturing method includes forming a capacitor element that is made by winding or laminating an anode body and a cathode body, between which a separator is sandwiched; forming an anode part over an element end-face by being drawn from the anode body of the capacitor element; forming a cathode part on the element end-face by being drawn from the cathode body of the capacitor element; interposing an anode current collector plate between an anode terminal member that is disposed in a sealing member, which seals an opening of a case member accommodating the capacitor element, and the anode part, and connecting the anode terminal member and the anode part; and interposing a cathode current collector plate between a cathode terminal member that is disposed in the sealing member, and the cathode part, and connecting the cathode terminal member and the cathode part.

Preferably, the above capacitor manufacturing method may further include superposing the anode terminal member on the anode current collector plate to weld side face parts of the anode terminal member and the anode current collector plate, or superposing the cathode terminal member on the cathode current collector plate to weld side wall face parts of the cathode terminal member and the cathode current collector plate.

Preferably, the above capacitor manufacturing method may further include positioning the face part of the anode current collector plate on the side face part of the anode terminal member, or positioning the side face part of the cathode current collector plate on that of the cathode terminal member, wherein said welding may be carried out on the side face parts as a common face.

Preferably, the above capacitor manufacturing method may further include superposing a single or a plurality of the current collector plate(s) on a single or a plurality of electrode protrusion part(s) that is/are drawn from one or both of electrode bodies, which include the anode body and the cathode body, to the element end-face of the capacitor element, setting a weld line on the current collector plate(s), the weld line crossing the electrode bodies of the capacitor element, and welding along the weld line.

Preferably, the above capacitor manufacturing method may further include setting a weld line that extends from a welding start point to a welding end point in the anode current collector plate or the cathode current collector plate, and connecting the anode current collector plate to the anode part or connecting the cathode current collector plate to the cathode part, by irradiation with a beam, the weld line being sequentially irradiated with the beam, the power of the beam being sequentially varied step by step.

Preferably, the above capacitor manufacturing method may further include the power of the beam at the welding start point of the weld line is set higher than that at the welding end point of the weld line, and is attenuated step by step or sequentially from the welding start point to the welding end point.

Preferably, the above capacitor manufacturing method may further include forming a first connecting face on the current collector plate that is placed on the element end-face of a capacitor element to be connected to an anode side or a cathode side, the first connecting face being arcuate in a side face direction of the capacitor element; forming a second connecting face on a terminal member that is connected to the current collector plate, the second connecting face being concentric with the first connecting face; placing the first connecting face and the second connecting face side by side, and using the capacitor element or a welding means that irradiates the first connecting face and the second connecting face with a beam to rotationally move the capacitor element or the welding means; and welding the first connecting face and the second connecting face to connect the current collector plate and the terminal member.

In the above capacitor manufacturing method, preferably, the first connecting face and the second connecting face may be formed so as to be concentric based on an element center of the capacitor element, and the capacitor element or the welding means may be rotationally moved around the element center as a rotation center.

In the above capacitor manufacturing method, preferably, each of the anode part and the cathode part may be formed by forming an electrode protrusion part of an anode side or a cathode side over the element end-face, an shape or an area of an end-face of the electrode protrusion part being different between the anode side and the cathode side, or by molding the electrode protrusion part that is formed over the element end-face, to have a different shape or area of an end-face of each of the anode part and the cathode part, the capacitor manufacturing method further including: discriminating between the anode side and the cathode side, using the shape or the area of the end-face of the electrode protrusion part, or the shape or the area of the end-face of the anode part or the cathode part, as identification information; and identifying the current collector plate as the anode side or the cathode side by the identification information, and the anode terminal member or the cathode terminal member may be connected to the current collector plate that is identified as the anode side or the cathode side.

Preferably, the above capacitor manufacturing method may further include recognizing the electrode protrusion part t, or the anode part or cathode part, to set a baseline on the element end-face, setting a center line that is parallel to the baseline and passes through an element center; detecting a displacing angle of the element end-face based on the element center and the center line; and correcting an angular position of the capacitor element by correction information that is generated by the displacing angle.

Additional objects and advantages of the present invention will be apparent from the following detailed description of the invention, which are best understood with reference to the accompanying drawings.

BRIEF DESCRIPTION OF THE SEVERAL VIEWS OF THE DRAWING

FIGS. 6A and 6B depict connecting steps of the capacitor element and the current collector plates;

FIGS. 11A to 11D depict an example of an anode body and a cathode body according to the fifth embodiment;

DETAILED DESCRIPTION OF THE INVENTION

First Embodiment

The first embodiment discloses a structure of providing current collector plates for connection between terminal members which are for external connection and a capacitor element.

Figure 1:
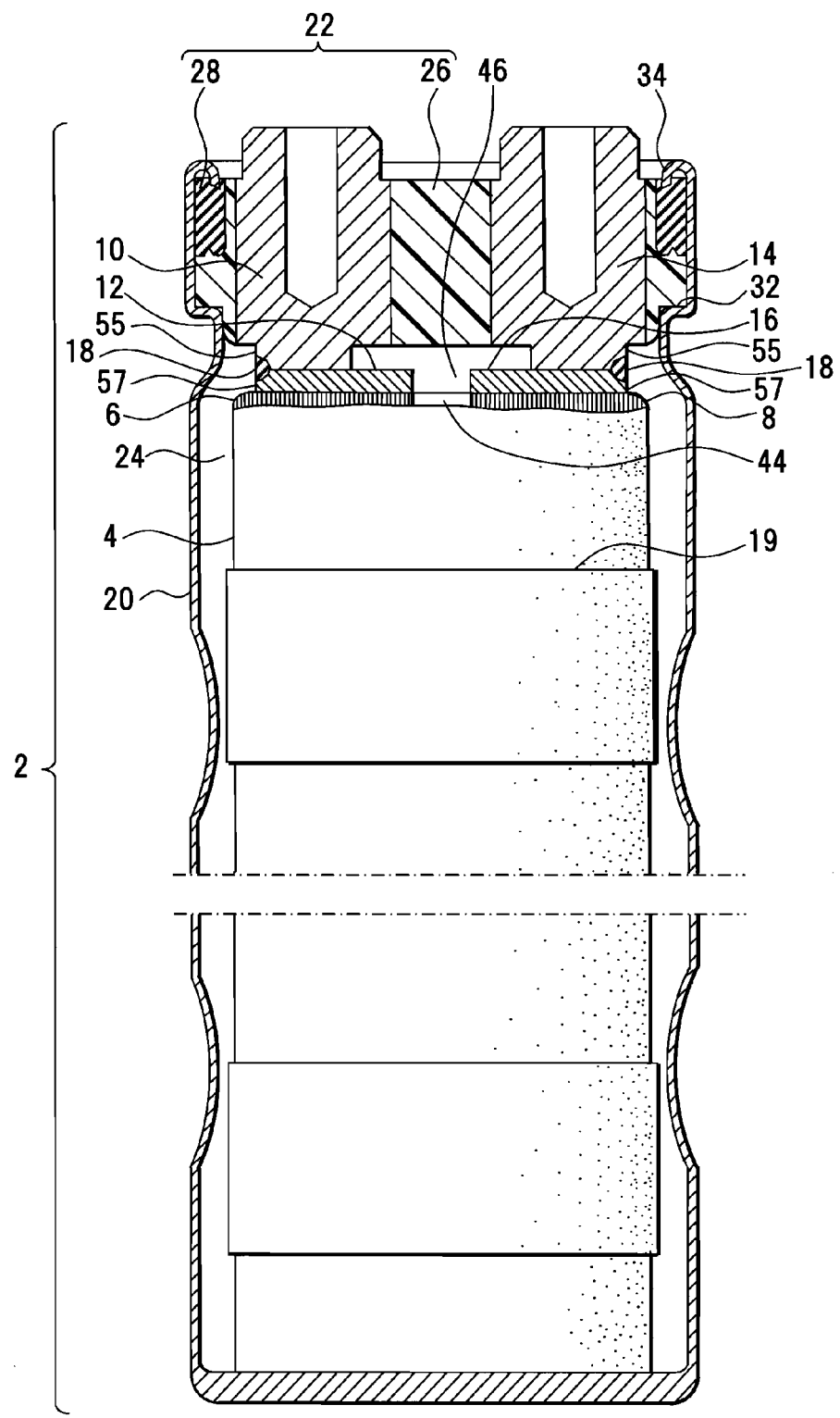
FIG. 1 is a plan view depicting an example of an electric double layer capacitor according to the first embodiment.
Figure 2:
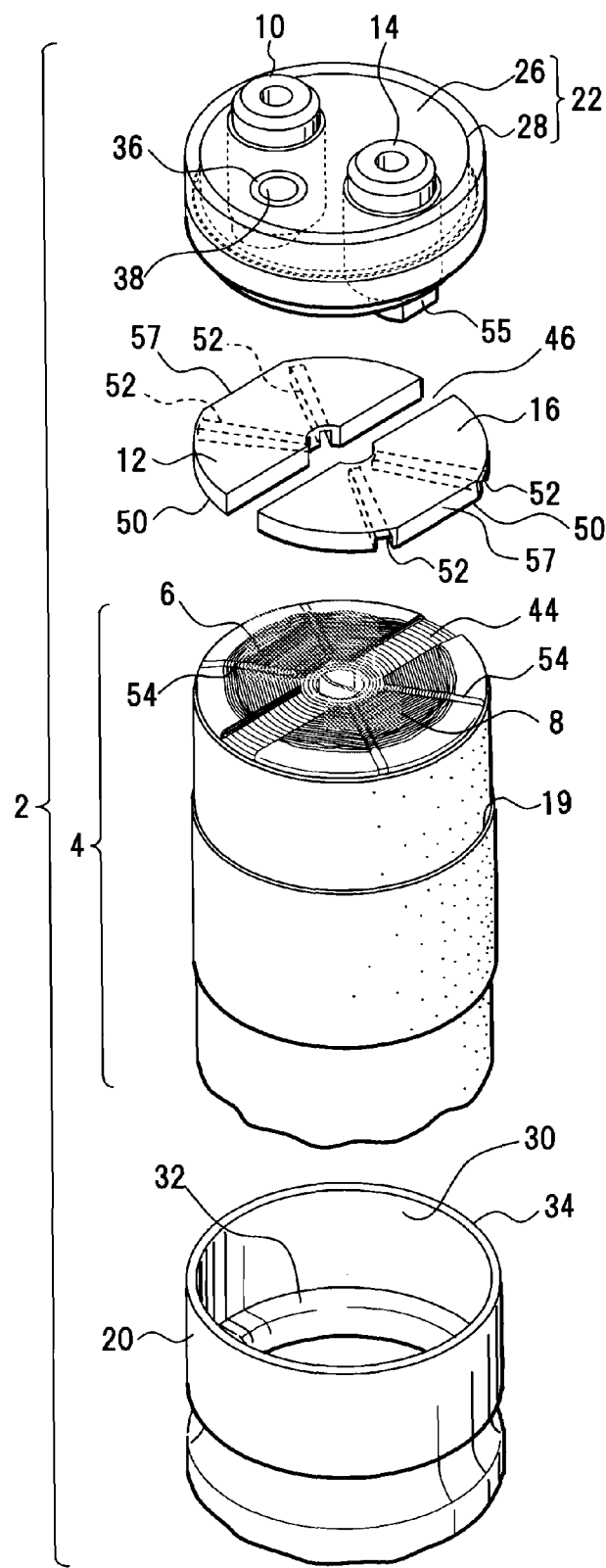
FIG. 2 is an exploded perspective view depicting the electric double layer capacitor.

FIGS. 1 and 2 will be referred to concerning the first embodiment. FIG. 1 represents a longitudinal cross-section depicting an example of an electric double layer capacitor and FIG. 2 depicts an example of the electric double layer capacitor, which is exploded.

This electric double layer capacitor (hereinafter, referred to as just "capacitor") 2 is an example of the capacitor and the manufacturing method of the capacitor of the present invention. As depicted in FIG. 1, an anode part 6 and a cathode part 8 are formed over one element end-face of a capacitor element 4 in this capacitor 2. An anode current collector plate 12 is interposed to connect an anode terminal 10 to the anode part 6, and a cathode current collector plate 16 is interposed to connect a cathode terminal 14 to the cathode part 8. For example, laser welding or electron beam welding is used for this connection, and 18 is an example of a welded connecting part. This welded connecting part 18 is adjacent to the anode current collector plate 12 and is set at the anode terminal 10, or is adjacent to the cathode current collector plate 16 and is set at the cathode terminal 14. The anode terminal 10 and the cathode terminal 14 are terminal members for external connection. The anode terminal 10 is an example of an anode terminal member and the cathode terminal 14 is an example of a cathode terminal member.

The capacitor element 4 has a cylindrical body. The anode part 6 is formed by drawing an anode body 60 (FIG. 3) from one element end-face, and the cathode part 8 is formed by drawing a cathode body 80 (FIG. 3) from the same element end-face. Keeping tapes 19 are wound around the capacitor element 4 to prevent the anode body 60 and the cathode body 80 from unwinding.

An outer packaging case 20 and a sealing plate 22 are provided as outer packaging members for the capacitor element 4. The outer packaging case 20 is a molding that is made of metallic materials having moldability, such as aluminum. The sealing plate 22 is a means for closing the opening of the outer packaging case 20 to keep the airtightness of a space 24. The sealing plate 22 is also a fixing member for fixing the anode terminal 10 and the cathode terminal 14, and even constitutes a supporting member for the capacitor element 4. In this embodiment, the sealing plate 22 includes a base part 26 and a sealing part 28. The base part 26 is formed by insulating materials such as synthetic resin. The anode terminal 10 and the cathode terminal 14 are fixed and insulated by the base part 26. The sealing part 28 is made of members of high hermeticity such as a rubber ring.

This sealing plate 22 is inserted into an opening 30 of the outer packaging case 20 (FIG. 2), and is positioned by a fastening step 32 that is formed in the middle of the opening 30. A curling process caulks an opening end 34 of the outer packaging case 20 to bite into the sealing part 28. Thereby, the outer packaging case 20 is firmly sealed. As depicted in FIG. 2, a through hole 36 and a pressure release mechanism 38 that is made of thin rubber is formed through the base part 26 of the sealing plate 22.

Figure 3:
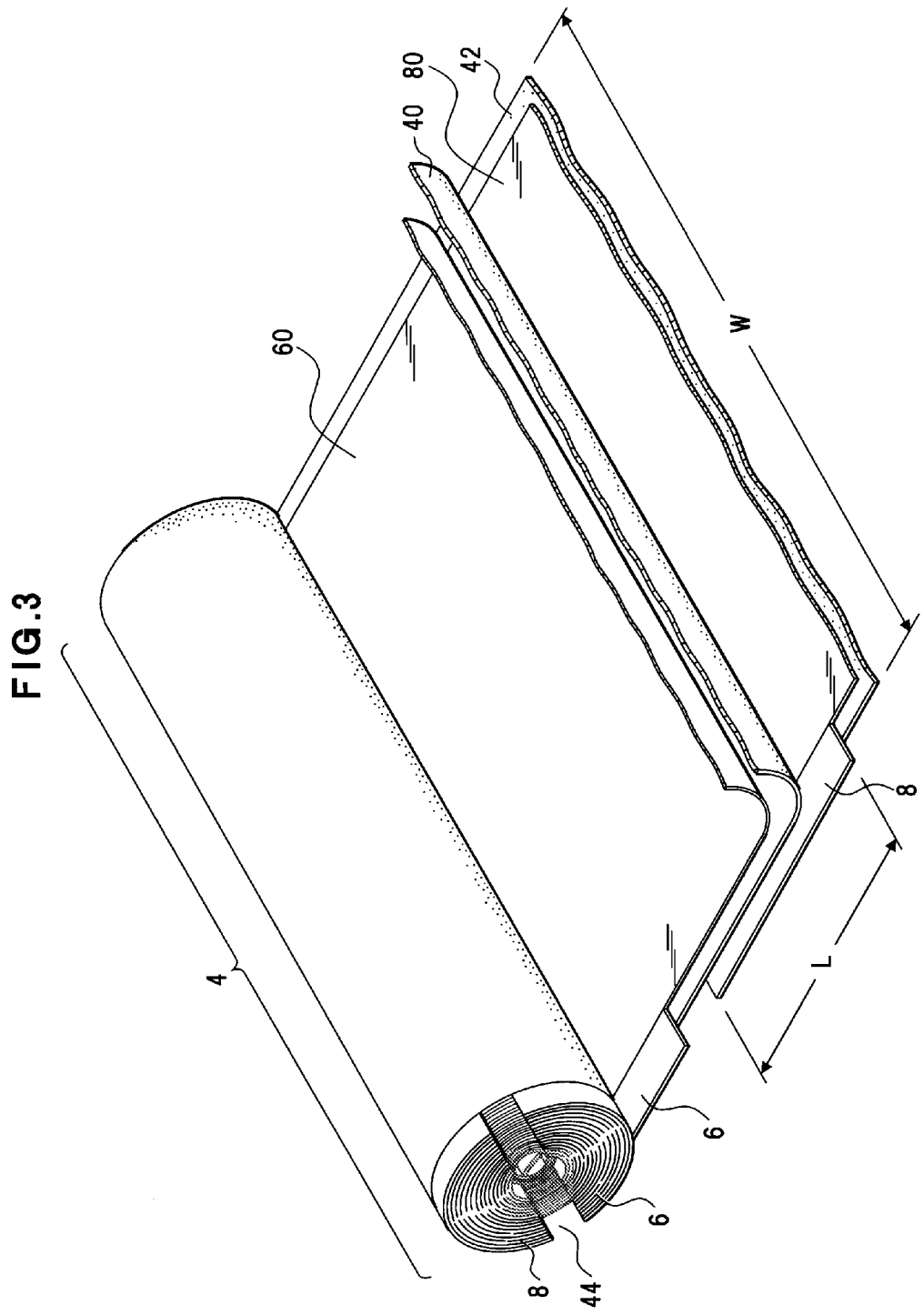
FIG. 3 is a perspective view depicting an example of a capacitor element that is partially exploded.

FIG. 3 will be referred to concerning the capacitor element 4. FIG. 3 depicts the capacitor element that is partially exploded.

As depicted in FIG. 3, this capacitor element 4 includes the anode body 60, the cathode body 80 and separators 40 and 42. The anode body 60 and the cathode body 80 are wound so that the separators 40 and 42 which insulate the anode body 60 and the cathode body 80 individually are sandwiched between the anode body 60 and the cathode body 80 to constitute a cylindrical wound element. For example, aluminum foil is used for base materials of the anode body 60 and the cathode body 80. Polarized electrodes, which include active materials such as activated carbon and binding agents, are formed over both sides of this aluminum foil.

This capacitor element 4 provides an isolation distance 44 of constant width between the anode part 6 and the cathode part 8 that are formed over one end-face. For example, the anode part 6 is formed by the base material of the anode body 60, and the cathode part 8 is formed by the base material of the cathode body 80 as well. When the anode body 60 and the cathode body 80 are made from aluminum, the anode part 6 and the cathode part 8 are base material parts of exposed aluminum faces where polarized electrodes are not formed.

A portion that is to form the anode part 6 or the cathode part 8 is arranged so as to be wider than width W of the separators 40 and 42 which are insulation means, and is formed so as to have length L that corresponds to arc length of the anode part 6 or the cathode part 8.

As depicted in FIG. 2, the anode part 6 or the cathode part 8 of the capacitor element 4 is processed to be formed so as to be in a state of close contact with the element end-face of the capacitor element 4 before connected to the anode current collector plate 12 or the cathode current collector plate 16.

Figure 4:
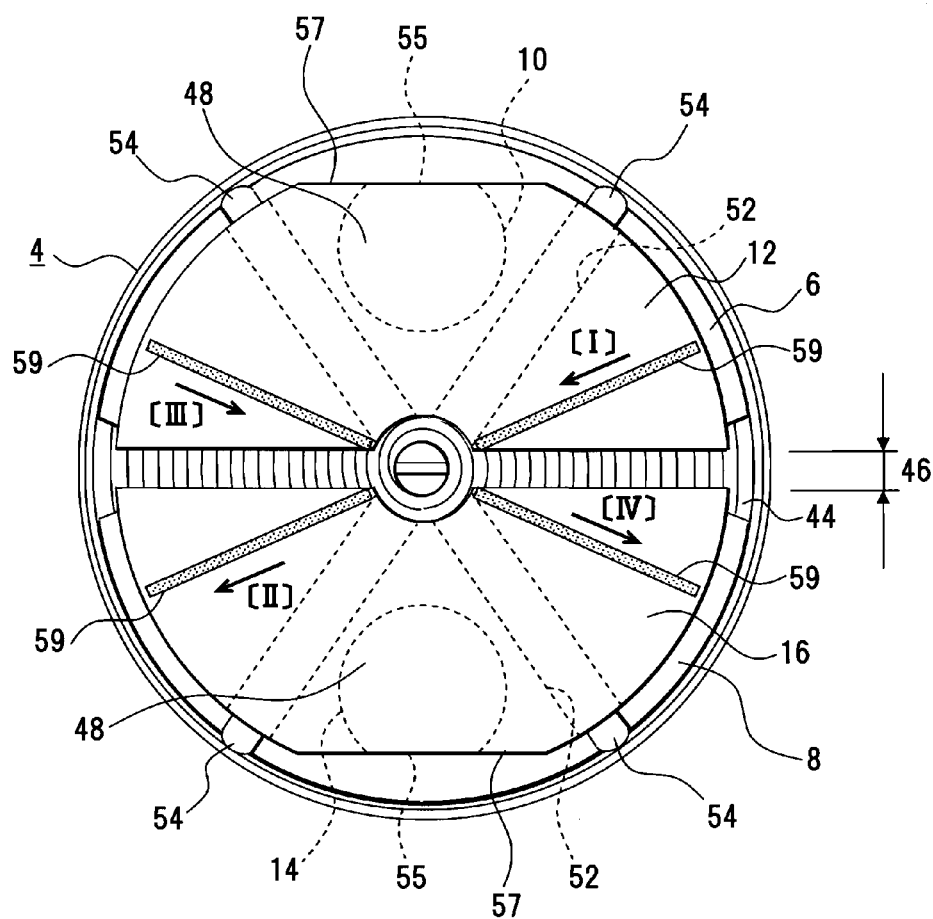
FIG. 4 depicts an example of arrangement of current collector plates over the capacitor element.

FIGS. 2 and 4 will be referred to concerning the anode current collector plate 12, the cathode current collector plate 16, and the anode part 6 and the cathode part 8 of the capacitor element 4. FIG. 4 depicts arrangement of the anode current collector plate and the cathode current collector plate over the element end-face of the capacitor element.

As depicted in FIG. 4, the anode current collector plate 12 and the cathode current collector plate 16 are disposed over one end-face of the capacitor element 4 with a space 46 that corresponds to the isolation distance 44 between the anode part 6 and the cathode part 8.

As depicted in FIG. 2, the anode current collector plate 12 and the cathode current collector plate 16 are semicircular shapes that divide the element end-face of the capacitor element 4 into two. On each top face of the anode current collector plate 12 the cathode current collector plate 16 in the drawing, a terminal connecting part 48 is formed, and over each of the other faces, an element connecting part 50 for connecting the anode part 6 or the cathode part 8 is formed. The element connecting part 50 has a flat face. A plurality of grooves 52 are radially formed in the element connecting part 50. A groove 52 forms a space for accommodating a projecting bar 54 that is on the anode part 6 or the cathode part 8.

The projecting bar 54 is a linear projection that is generated by a stack of the anode part 6 or the cathode part 8 of the capacitor element 4 at the slit parts when slits are made in, and compression molding is carried out on the anode part 6 or the cathode part 8. The size of the height of the anode part 6 and the cathode part 8 of the capacitor element 4 can be limited by such compression molding, by which the whole anode part 6 and the cathode part 8 are molded toward the center of the capacitor element 4. In this embodiment, compression molding is first carried out on the center that is one of three portions into which each anode part 6 and cathode part 8 is divided by slits, and then compression molding is sequentially carried out on both back end portions of the center. Thus, the size of the height of the projecting bars 54, which are generated by the stacks and are linear, is limited. The projecting bar 54 is accommodated by each groove 52 that is formed in the element connecting part 50 of the anode current collector plate 12 or the cathode current collector plate 16. Thereby, the anode part 6 or the cathode part 8 is brought into close contact with the element connecting part 50, is welded on the element connecting part 50 in a state of close contact, and thus can be electrically connected with the element connecting part 50.

Connection between the anode part 6 and the anode current collector plate 12, or connection between the cathode part 8 and the cathode current collector plate 16 will be described in detail. As depicted in FIG. 2, the anode current collector plate 12 and the cathode current collector plate 16 are arranged over the anode part 6 and the cathode part 8 on which compression molding is carried out, and as depicted in FIG. 4, are pressed to be brought into close contact with the anode part 6 and the cathode part 8. As described above, the projecting bar 54 on the anode part 6 or the cathode part 8 is accommodated by the grooves 52 in the anode current collector plate 12 or the cathode current collector plate 16, and the element connecting part 50 is brought into close contact with the anode part 6 or the cathode part 8. In this state, a top face side of the anode current collector plate 12 or the cathode current collector plate 16 that corresponds to the element connecting part 50 is irradiated with a laser. Thereby, each element connecting part 50, and the anode part 6 and the cathode part 8 are melted to be connected.

In this embodiment, as depicted in FIG. 4, two portions are irradiated with a laser, which are: both end sides of the element connecting part 50 that are separated by the grooves 52 in each anode current collector plate 12 and the cathode current collector plate 16. Laser irradiated connecting parts 59 are connecting parts welded by irradiation with a laser, and constitute weld lines by irradiation with a laser. In this case, irradiation with a laser is indicated by arrows [I], [II], [III] and [IV] that refer to the laser irradiated connecting parts 59 of FIG. 4, that is:

[I] one current collector plate 12 is linearly irradiated from the outer circumference side of the capacitor element 4 toward the element center; and

[II] next, the other current collector plate 16, which faces toward the current collector plate 12 across the element center, is linearly irradiated from the element center side toward the outer circumference side of the element. Thereby, welding is done by a sequence of these operations;

as well, as to irradiation with a laser:

[III] one current collector plate 12 is irradiated linearly from the outer circumference side of the capacitor element 4 toward the element center; and

[IV] then, the other current collector plate 16, which faces toward the current collector plate 12 across the element center, is linearly irradiated from the element center side toward the outer circumference side of the element. Thereby, welding is done by a sequence of these operations.

As the above, the anode part 6 and the cathode part 8 are respectively connected to the anode current collector plate 12 and the cathode current collector plate 16 by a sequence of the operations of linear irradiation with a laser across the element center. A sequence of the operations of irradiation with a laser [I] and [II] is repeated twice. Or, it is also possible to arrange welded parts close to each other by repeating a sequence of the operations of irradiation with a laser [I] to [IV] twice so as to further reduce the connection resistance. While the connection can be done by a sequence of the operations of irradiation with a laser [I] and [II], the element connecting parts 50 of the anode current collector plate 12 and the cathode current collector plate 16 can be individually connected by linear irradiation from the element center side toward the outer circumference side of the element, or the like.

Concerning sequential operations of irradiation with a laser of [I] to [IV], the same part is not sequentially irradiated with a laser, but laser welding is done through [I] to [IV], and then, irradiation with a laser is carried out again through [I] to [IV]. Thereby, a time interval between operations of irradiation with a laser on the same part can be provided. As a result, cooling of laser irradiating portions can be achieved, and the stability of connection by laser welding is also achieved. It is possible to provide time intervals and carry out irradiation with a laser on the same part several times. However, because the first laser welding is done through [I] to [IV] and then, laser welding is done through [I] to [IV] again, irradiation with a laser can be sequentially carried out while intervals for cooling are taken, to make it possible to achieve shorter time for welding by irradiation with a laser.

As depicted in FIG. 2, the anode part 6 and the cathode part 8 are drawn from the end-face of the capacitor element 4 with the provided predetermined isolation distance 44. The isolation distance 44 is arranged for the anode part 6 and the cathode part 8, so that the anode part 6 and the cathode part 8 are not in contact with each other when the compression molding toward the center is done. Therefore, the anode part 6 and the cathode part 8 are not formed in the vicinity of the center of the capacitor element 4. Further, the more portions that form the anode part 6 and the cathode part 8 increase (or the larger their areas are), the more the resistance is reduced. Thus, for example, the range of 3 mm to 10 mm is set for the isolation distance 44, so that the anode part 6 and the cathode part 8 is not in contact with each other and reduction of the resistance can be achieved.

There may occur slippage or the like on the outermost circumference of the capacitor element 4 when compression molding is carried out on the anode part 6 and the cathode part 8. In this case, it is necessary for the anode part 6 and the cathode part 8 not to be in contact with the outer packaging case 20. For example, insulation means such as insulating tape may be placed on the outer circumferential face of the anode part 6 that is connected to the anode current collector plate 12 and the cathode part 8 that is connected to the cathode current collector plate 16.

In this embodiment, a flat connecting face 55 for laser welding is formed on the outer wall of each anode terminal 10 and cathode terminal 14. A flat connecting face 57 is formed on each anode current collector plate 12 and cathode current collector plate 16 by a notch. These flat connecting faces 55 and 57 constitute a coinciding face. The vicinity of their border is irradiated with a laser, the flat connecting faces 55 and 57 are welded, and, as depicted in FIG. 1, the welded connecting parts 18 are formed. There is only a quite little space between the capacitor element 4 and the sealing plate 22. That is, the space (distance) between the capacitor element 4 and the sealing plate 22 is as small as possible because the larger the space (distance) between the capacitor element 4 and the sealing plate 22 is, the more the resistance is increased and the larger the size of the height of the capacitor 2 is. In order to connect the anode terminal 10 and the anode current collector plate 12 and connect the cathode terminal 14 and the cathode current collector plate 16 in such a small space, the flat connecting faces 55 and 57 are arranged as a common coinciding face as described above, and this face is welded by a laser, by which welding can be performed locally, to achieve simplification and reinforcement of the welding. The range of 0.5 mm to 5 mm is set for the anode current collector plate 12, the cathode current collector plate 16, the anode terminal 10 and the cathode terminal 14 in thickness (for the flat connecting faces 55 and 57 in size of the height). This is the size that allows laser welding, makes it difficult to increase the internal resistance, and can make the size of the height of the capacitor 2 small.

The flat connecting faces 55 and 57 are formed into flat faces by notches, but are not limited to flat faces. The flat connection faces 55 and 57 may be curved, and just needs to be a coinciding face. The flat connecting faces 55 and 57 may be inclined faces (taper faces). There may occur a gap between the flat connecting faces 55 and 57 according to the accuracy of processing the flat connecting faces 55 and 57. The flat connecting faces 55 and 57 are preferable to be placed in the vicinity of the outer circumferential face of the capacitor element 4. This is effective especially because preventing excessive stress on other members (the anode part 6 and the cathode part 8) in irradiation with a laser. For example, it is preferable to place the flat connecting faces 55 and 57 within 10 mm of the outer circumferential face of the capacitor element 4.

The stability of the connection in laser welding is improved by the above setting of separate connecting portions for the anode part 6 and the cathode part 8 of the capacitor element 4 to the anode current collector plate 12 and the cathode current collector plate 16, and for the anode terminal 10 and the cathode terminal 14 to the anode current collector plate 12 and the cathode current collector plate 16.

Assembly of this capacitor 2 and the capacitor 2 itself are as described above. That is, the outer packaging case 20 that has a tubular shape and the bottom, and is formed by metallic materials such as aluminum is used for this capacitor 2. The capacitor element 4 and the sealing plate 22 are inserted into the outer packaging case 20. This sealing plate 22 is fixed on the fastening step 32 of the outer packaging case 20 where drawing is processed. A curling process makes the opening end 34 of the outer packaging case 20 bite into the sealing part 28, to seal the outer packaging case 20. The keeping tapes 19, which are processed when winding the capacitor element 4 is ended as described above, are wound around the circumference of capacitor element 4.

Features and advantages of the capacitor 2 of the first embodiment described above will be listed as follows:

(1) Over one end-face of the capacitor element 4, the anode part 6 is formed by a base material of the anode body 60, and the cathode part 8 is formed by a base material of the cathode body 80. The anode part 6 is connected to the anode terminal 10 via the anode current collector plate 12, and moreover, the cathode part 8 is connected to the cathode terminal 14 via the cathode current collector plate 16. Thereby, the simplification of the terminal connection is achieved. The connection can be even facilitated.

(2) The space occupancy rate that is the rate of the space of connecting portions per the space 24 in the outer packaging case 20 is extremely low.

(3) The capacitor element 4 is robustly supported by the sealing plate 22, which is an outer packaging member. That is, the anode part 6 and cathode part 8 of the capacitor element 4 is robustly fixed to the anode terminal 10 and the cathode terminal 14 through the anode current collector plate 12 and the cathode current collector plate 16 by laser welding. Thus, the strength to support the capacitor element 4 is improved. As a result, a mechanically robust supporting structure is constituted to make it possible to improve shockproof of products.

(4) The anode part 6 is formed by a plurality of the side edge parts that are collected from the anode body 60, which is wound as the capacitor element 4, which is a wound element. This anode part 6 is welded to the anode current collector plate 12 by laser. Similarly, the cathode part 8 is formed by a plurality of the side edge parts that are collected from the cathode body 80. This cathode part 8 is welded to the cathode current collector plate 16 by laser. Thus, the reduction of the resistance of the capacitor element 4 and the capacitor 2 can be achieved. That is, products whose equivalent series resistances are low can be offered.

(5) It is not necessary to connect tubs to the capacitor element 4 because the anode current collector plate 12 and the cathode current collector plate 16 are used.

(6) As described above, the sequential operations of irradiation with a laser [I] to [IV] are not limited to sequential irradiation with a laser on the same part. First, laser welding is carried out through [I] to [IV] and after that, irradiation with a laser may be carried out through [I] to [IV]. It is possible to further reduce the connection resistance if welded portions are arranged in the vicinity of a weld line as a plurality of lines. Moreover, a time interval can be provided between operations of irradiation with a laser on the same part. As a result, cooling of laser irradiating portions can be achieved, and the stability of connection by laser welding is also achieved.

(7) It is possible to provide time intervals and carry out irradiation on the same part with a laser several times. However, if the first laser welding is done through [I] to [IV] and then, laser welding is done again adjacently to the first laser welding, irradiation with a laser can be sequentially carried out while intervals for cooling are taken, to make it possible to achieve shorter time for welding by irradiation with a laser.

Second Embodiment

The second embodiment discloses a manufacturing method for the above described capacitor.

Figure 5:
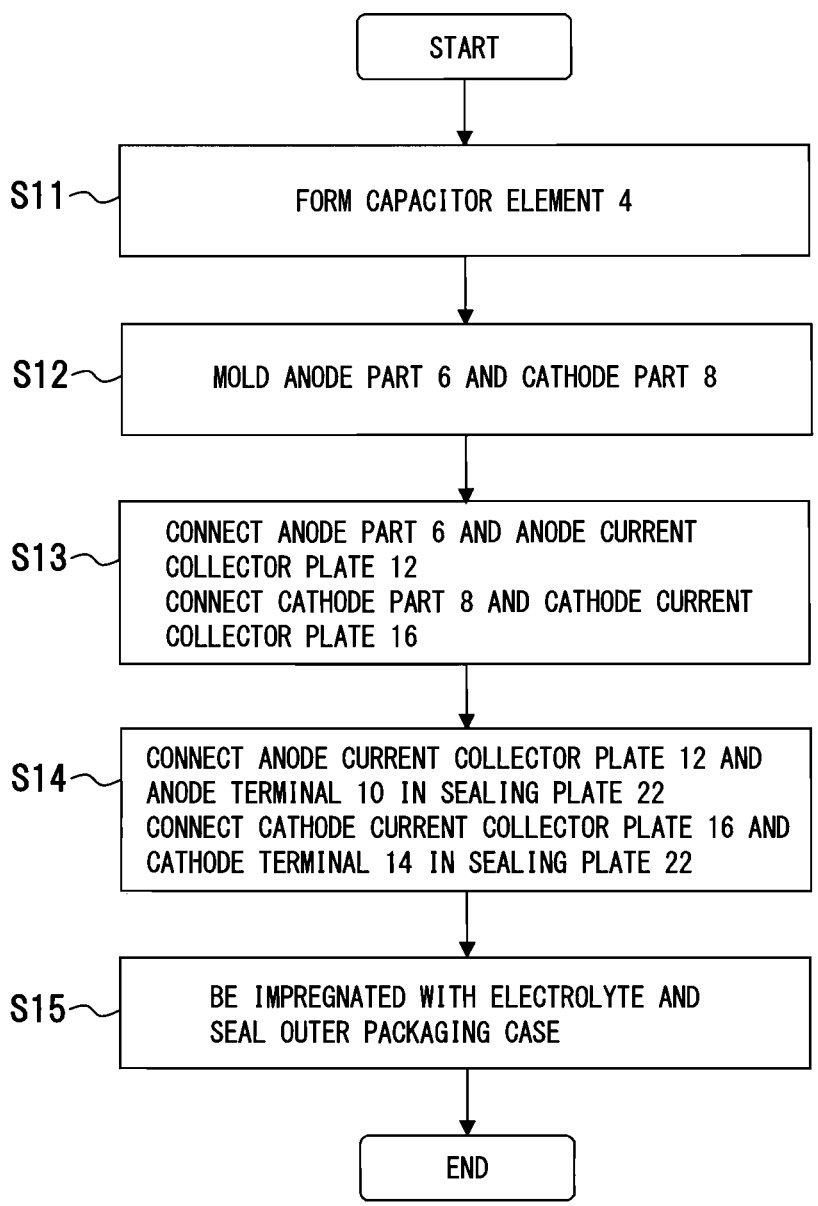
FIG. 5 is a flowchart depicting an example of manufacturing steps of the electric double layer capacitor according to the second embodiment.

FIG. 5 will be referred to concerning the second embodiment. FIG. 5 is a flowchart depicting an example of manufacturing steps of the capacitor according to the second embodiment.

These manufacturing steps are an example of a capacitor manufacturing method of the present invention. The capacitor element 4 is formed as depicted in FIG. 6A (step S11) and the anode part 6 and the cathode part 8 of the capacitor element 4 are molded as depicted in FIG. 2 (step S12).

As depicted in FIG. 6A, the anode current collector plate 12 and the cathode current collector plate 16 are respectively positioned over the anode part 6 and the cathode part 8 of the capacitor element 4, so that each projecting bar 54 is inserted into the groove 52. The anode current collector plate 12 is connected to the anode part 6 and the cathode current collector plate 16 is connected to and the cathode part 8 by laser welding (step S13). In FIG. 6B, 56 is a welded connecting part by laser welding as well as the above described welded connecting part 18. The welded connecting parts are irradiated with a laser beam 53 as indicated by an arrow.

The flat connecting faces 55 and 57 (FIG. 4) are made to coincide, and the anode terminal 10 in the sealing plate 22 is connected to the anode current collector plate 12 that is connected to the anode part 6, by laser welding; similarly, the cathode terminal 14 in the sealing plate 22 is connected to the cathode current collector plate 16 that is connected to the cathode part 8, by laser welding (step S14).

Figure 7:
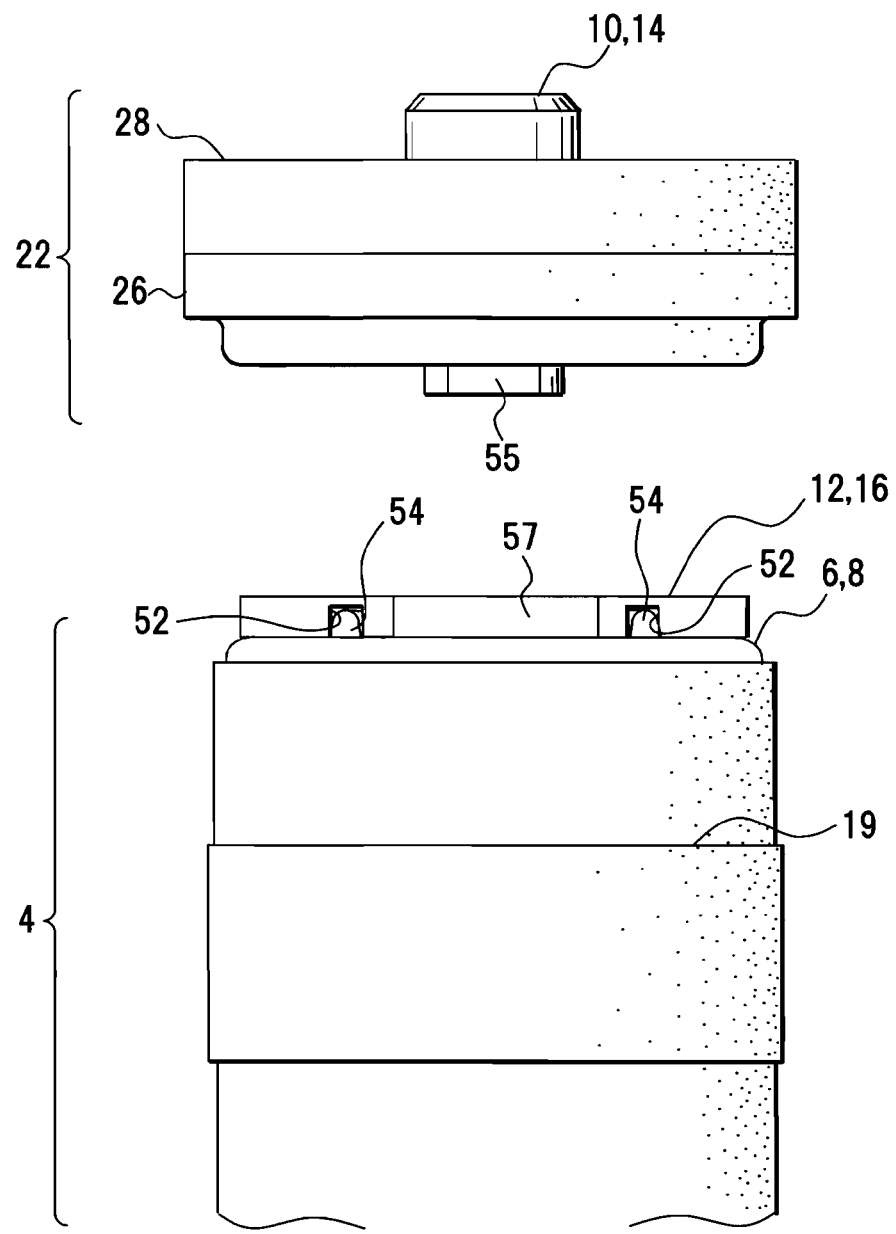
FIG. 7 depicts connecting steps of external terminals and the current collector plates.

In this embodiment, as depicted in FIG. 7, the anode terminal 10 in the sealing plate 22 is positioned on the anode current collector plate 12 that is connected to the anode part 6 of the capacitor element 4, and at the same time, the cathode terminal 14 in the sealing plate 22 is positioned on the cathode current collector plate 16 that is connected to the cathode part 8 of the capacitor element 4. Thereby, laser welding is carried out on each terminal. Reference signs 18 (FIG. 1) and 56 (FIG. 6B) are welded connecting parts.

Concerning the sealing plate 22, the anode terminal 10 and the cathode terminal 14 are inserted to mold synthetic resin (insert-molding). Thereby, the base part 26 and the sealing part 28 are formed.

The outer packaging case 20 accommodates the capacitor element 4 after the capacitor element 4 is impregnated with electrolyte, and is sealed by a curling process for the opening end 34 thereof (step S15). Thus, the capacitor 2, which is a product, is completed.

According to such manufacturing steps, the above described capacitor 2 can be easily manufactured, and the simplification of terminal connecting steps can be achieved.

Third Embodiment

The third embodiment discloses a connection structure using connecting plates that are interposed between current collector plates and external terminal members, and a manufacturing method of the connection structure.

Figure 8:
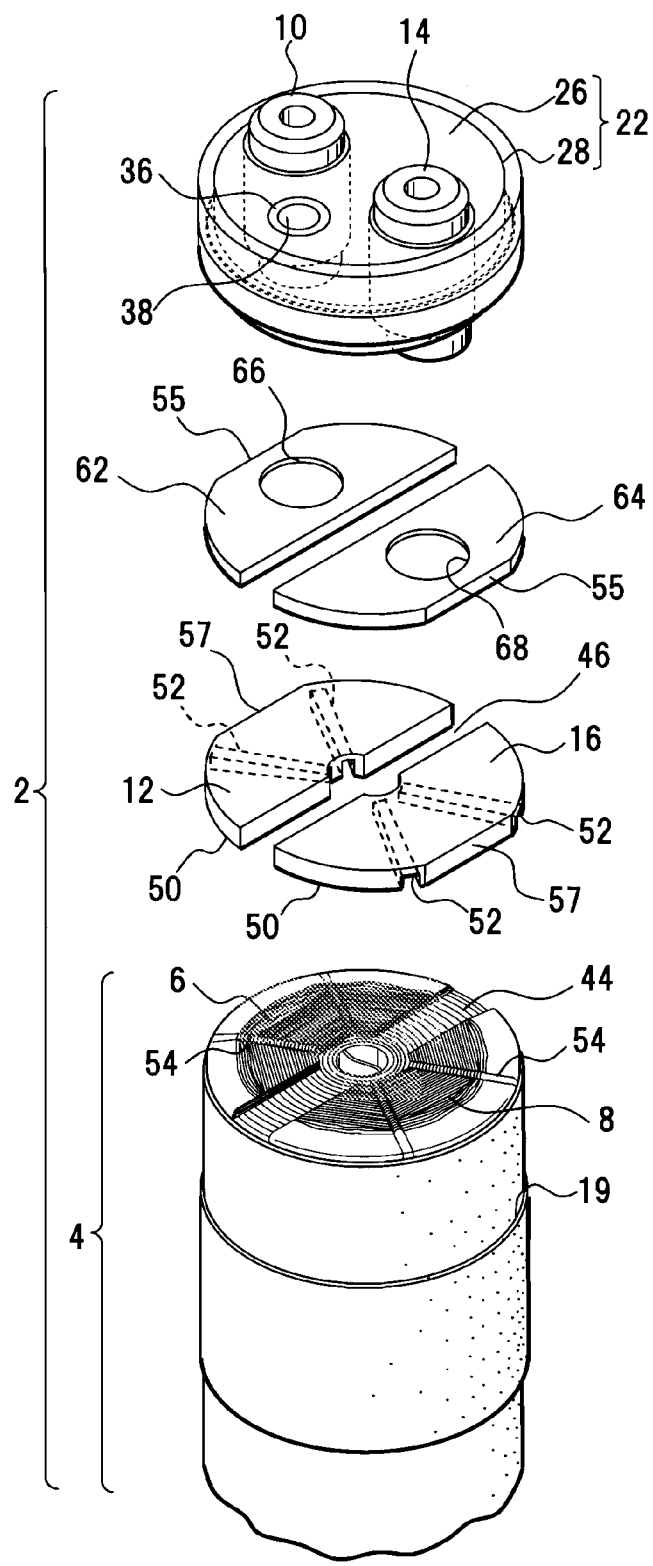
FIG. 8 depicts an example of the electric double layer capacitor according to the third embodiment.

FIG. 8 will be referred to concerning the third embodiment. FIG. 8 depicts the capacitor according to the third embodiment.

As depicted in FIG. 8, in this third embodiment, the capacitor 2 has a structure of providing an anode connecting plate 62 as an anode terminal member along with the anode terminal 10 and a cathode connecting plate 64 as a cathode terminal member along with a cathode terminal 14. The anode connecting plate 62 is connected to the anode current collector plate 12 of the capacitor element 4 side after connected to the anode terminal 10 by laser welding. As well, the cathode connecting plate 64 is connected to the cathode current collector plate 16 of the capacitor element 4 side after connected to the cathode terminal 14 by laser welding. A recess for connection 66 that is for positioning and connecting the anode terminal 10 is formed on the anode connecting plate 62, and a recess for connection 68 that is for positioning and connecting the cathode terminal 14 is formed on the cathode connecting plate 64.

The manufacturing method of the capacitor that provides such an anode connecting plate 62 (cathode connecting plate 64) includes a connecting step of the anode current collector plate 12 (cathode current collector plate 16), a connecting step of the anode connecting plate 62 (cathode connecting plate 64), and a connecting step of the anode current collector plate 12 (cathode current collector plate 16) to the anode connecting plate 62 (cathode connecting plate 64). In the connecting step of a current collector plate (anode current collector plate 12, cathode current collector plate 16), a current collector plate (anode current collector plate 12, cathode current collector plate 16) is connected to an electrode protrusion part (anode part 6, cathode part 8) that is drawn from an electrode of the capacitor element 4 (anode body 60, cathode body 80) to the element end-face of the capacitor element 4. After this connecting step, in the connecting step of a connecting plate (anode connecting plate 62, cathode connecting plate 64), the connecting plate (anode connecting plate 62, cathode connecting plate 64) is connected to an external terminal (anode terminal 10, cathode terminal 14) that is disposed in a sealing unit (sealing plate 22) of the outer packaging case 20, which accommodates the capacitor element 4. In the connecting step of a current collector plate (anode current collector plate 12, cathode current collector plate 16) and a connecting plate (anode connecting plate 62, cathode connecting plate 64), the current collector plate (anode current collector plate 12, cathode current collector plate 16) and the connecting plate (anode connecting plate 62, cathode connecting plate 64) are connected along their flat connecting faces (55, 57).

According to a structure using such an anode connecting plate 62 and cathode connecting plate 64, the anode terminal 10 and the cathode terminal 14, which are external terminals, are connected to the anode current collector plate 12 and the cathode current collector plate 16, which are connected to the capacitor element 4 side, in a wide range. Thereby, the connection resistance can be reduced and even the connection strength can be improved.

Fourth Embodiment

The fourth embodiment discloses a variation and side welding of the above described anode current collector plate (or cathode current collector plate).

Figure 10A:
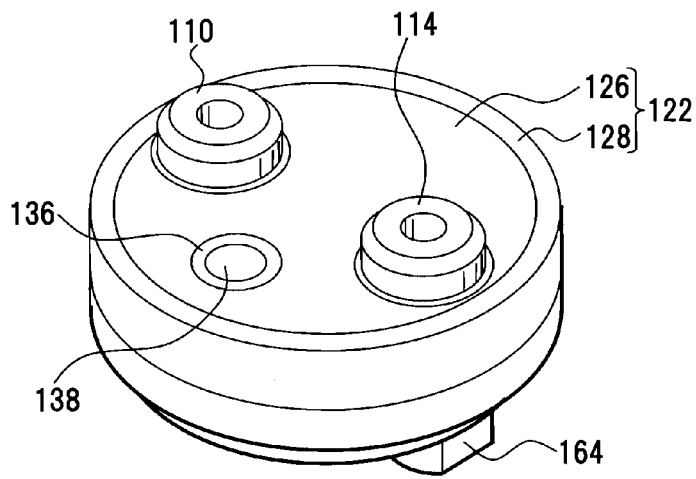
FIGS. 10A and 10B depict the connection between current collector plates that are over the capacitor element and the external terminals according to the fourth embodiment.
Figure 10B:
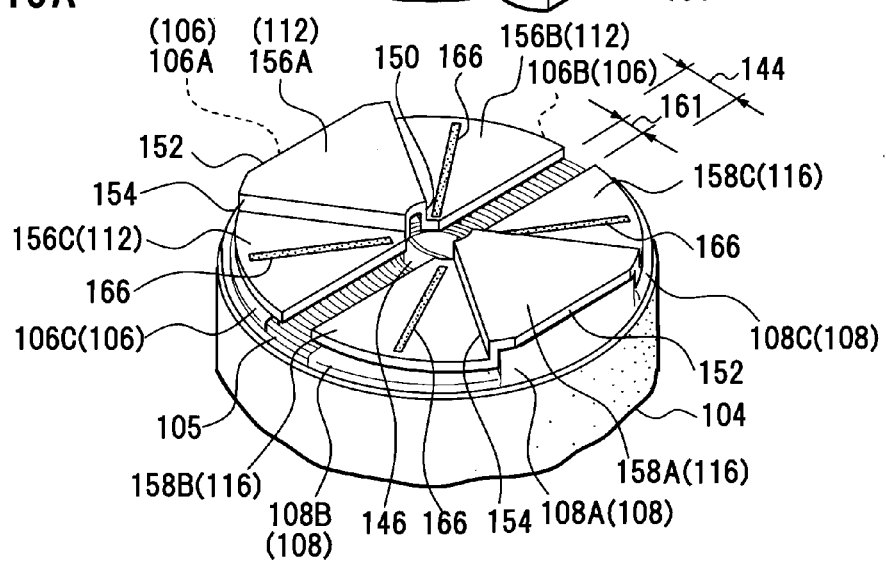

FIGS. 10A and 10B depict an exploded connection structure of an anode current collector plate (or cathode current collector plate) according to the fourth embodiment.

This anode current collector plate 112 according to the fourth embodiment is formed by the same aluminum as an electrode material, for example. This anode current collector plate 112 covers sections 106A, 106B and 106C of an anode part 106, provides an area for laser welding to the sections 106B and 106C, and has a shape and an area enough for laser welding to an anode terminal 110. In this embodiment, the anode current collector plate 112 is a half of the element end-face of a capacitor element 104 in size. That is, the anode current collector plate 112 is an almost semicircular plate as a shape that ensures an isolation distance 144.

An arcuate notch 150 is formed at the center of the chord side of the anode current collector plate 112 correspondingly to a winding center 146 of the capacitor element 104. The arc side of the anode current collector plate 112 is linearly cut off along a line to which an X axis (for example, the X axis depicted in FIG. 15A) is orthogonal and thorough the center of which the X axis passes, to form a connecting face 152. A terminal connecting part 156A and element connecting parts 156B and 156C are also formed over this anode current collector plate 112 as arcuate connecting areas by steps 154. The steps 154 are formed by bending the anode current collector plate 112 perpendicularly, so that the terminal connecting part 156A has angles $\theta_1$ each of which is the left and the right of the arcuate notch 150, that is, the X axis, as the center. The terminal connecting part 156A, and the element connecting parts 156B and 156C are formed flat, and make parallel plane with the steps 154 therebetween. Such a structure applies to a cathode current collector plate 116 as well.

FIGS. 10A and 10B depict the connection between the anode terminal 110 and the anode current collector plate 112, and the connection between a cathode terminal 114 and the cathode current collector plate 116. FIG. 10A depicts a state before connection of the anode terminal and the anode current collector plate, and connection of the cathode terminal and the cathode current collector plate. FIG. 10B depicts irradiation with a laser.

The anode terminal 110 and the cathode terminal 114 in a sealing plate 122 are positioned on the capacitor element 104 where the anode current collector plate 112 and the cathode current collector plate 116 are connected. A terminal side connecting face 164 is formed on side face parts of the anode terminal 110 and cathode terminal 114. The terminal side connecting faces 164 are side wall faces that form coinciding faces with the connecting faces 152 of the anode current collector plate 112 and cathode current collector plate 116. These connecting faces 152 and terminal side connecting faces 164 are made to coincide and irradiation with a laser 168 is carried out thereon. Thereby, welded connecting parts 118 are welded by laser, to allow the connecting faces 152 and the terminal side connecting faces 164 to be welded.

Therefore, the welded connecting part 118 by the irradiation with a laser 168 connects the anode terminal 110, which is an external terminal, to the anode part 106 of the capacitor element 104 through the anode current collector plate 112. Also, the welded connecting part 118 by the irradiation with a laser 168 connects the cathode terminal 114, which is an external terminal, to the cathode part 108 of the capacitor element 104 through the cathode current collector plate 116. Thus, the external terminals are formed on the capacitor element 104.

Over the anode current collector plate 112 and the cathode current collector plate 116, connecting areas for the anode part 106 and the cathode part 108 of the capacitor element 104 (that is, the element connecting part 156B and the element connecting part 156C of the anode side and the element connecting part 158B and the element connecting part 158C of the cathode side) are set in positions different from connecting areas for the anode terminal 110 and the cathode terminal 114 (that is, the terminal connecting part 156A of the anode side and the terminal connecting part 158A of the cathode side). Thereby, the connection between electrode parts and current collector plates, and the connection between external terminals and current collector plates can be stabilized, and the reduction of the resistance of the capacitor element and the enhanced connection can be achieved.

According to a capacitor (electric double layer capacitor) 102 of the above described fourth embodiment, the side of the anode current collector plate 112 or the cathode current collector plate 116 and an external terminal (anode terminal 110 or cathode terminal 114) is made to coincide. Thereby, irradiation for them with a laser can be stabilized, the connection can be completed, and the reliability can be improved.

Fifth Embodiment

In the fifth embodiment, it is disclosed to carry out fold processing on electrode bodies that are drawn to the element end-face of a capacitor element, and a process for electrode protrusion parts that are molded using a fold is also disclosed.

FIGS. 11A to 11D and 12A to 12C depict processing of electrode protrusion parts of the capacitor element according to the fifth embodiment.

The processing of the electrode protrusion parts of the capacitor element depicted in FIGS. 11A to 11D and 12A to 12C includes a forming step of the electrode bodies, a fold-forming step and a forming step of the electrode parts.

(1) Forming Step of the Electrode Bodies

In this forming step of the electrode bodies, an electrode body of an anode side or a cathode side is formed. In this forming step of the electrode bodies, an uncoated part 244 (anode parts 206, cathode parts 208), which is an electrode protrusion part for current collection over the end-face of the capacitor element 204, is formed as depicted in FIG. 11A.

For example, aluminum foil is used for base materials 240 of an anode body 260 and a cathode body 280. Each base material 240 has a strip-shaped body of constant width. A polarized electrode 242, which includes active materials such as activated carbon and binding agents, is formed over both sides of each of this base material 240. When this polarized electrode 242 is formed, the uncoated part 244 of constant width is formed along one edge of each base material 240. This uncoated part 244 is a portion where the polarized electrode 242 is not formed. This uncoated part 244 is the above described electrode protrusion part. This uncoated part 244 forms the anode parts 206 or the cathode parts 208.

(2) Fold-Forming Step

In this fold-forming step, as depicted in FIG. 11B, a fold line 246 that has constant distance from the edge is formed in the above described uncoated part 244. This fold line 246 is a line for simplifying folding processing. In short, this fold line 246 is not a scratch but a marking-off line, and can prevent buckling when the anode parts 206 and the cathode parts 208 are folded. This fold line 246 is a groove. The cross-sectional shape of the fold line 246 may be a triangle, rectangle, or curve (R). For example, pressing, a laser, and cutting are listed as a method for forming this fold line 246. While only one fold line 246 can be formed as depicted in FIG. 11B, a plurality of fold lines 246 may be formed in view of the size of the uncoated part 244. Also, the fold line 246 may be formed on either one side or both sides.

(3) Forming Step of the Electrode Parts

In this forming step of the electrode parts, as depicted in FIG. 11C, a plurality of the anode parts 206, each of which has different width, are formed from the anode body 260, and as depicted in FIG. 11D, a plurality of the cathode parts 208, each of which has different width, are formed from the cathode body 280. The anode parts 206 are formed so as to make intervals different from each other in order that one anode part 206 is drawn to the element end-face of the capacitor element 204 every half a wind. One cathode part 208 is drawn to the element end-face of the capacitor element 204 every half a wind as well. Moreover, an isolation distance 221 is set between each anode part 206 and each cathode part 208. The above described fold line 246 is formed on each anode part 206 and each cathode part 208.

Figure 12A:
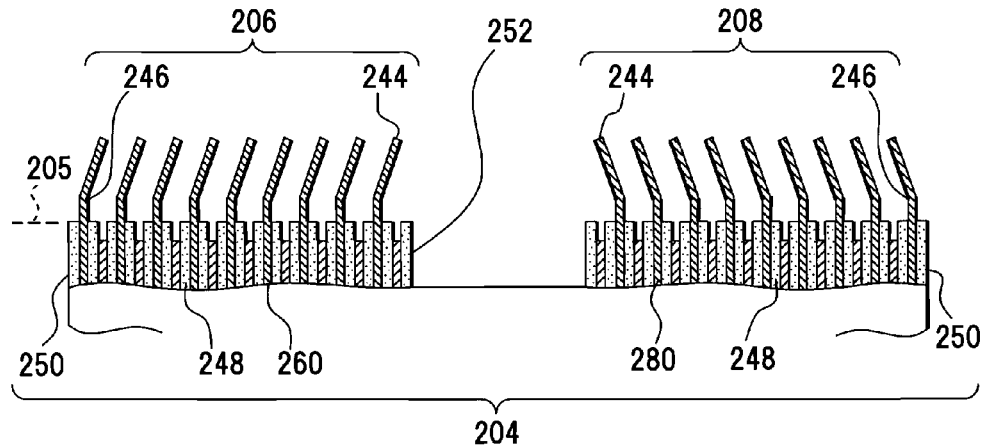
FIGS. 12A to 12C depict an example of molding steps of an anode part and a cathode part of a capacitor element.
Figure 12B:
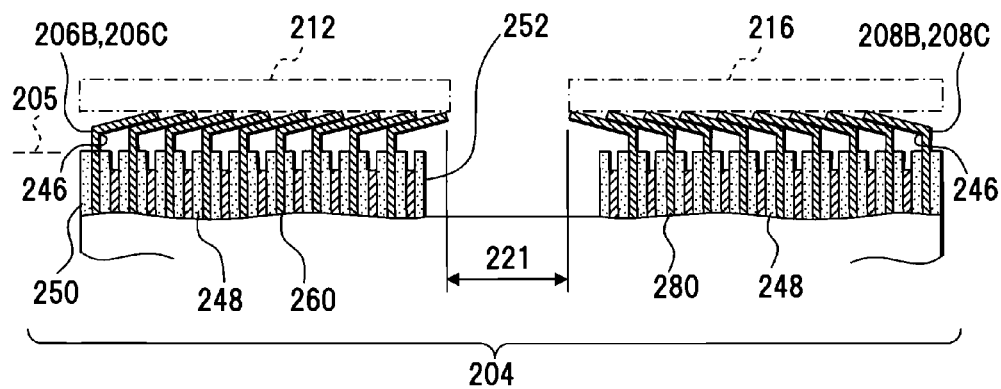

In a molding step of the anode parts 206 and the cathode parts 208, after the capacitor element 204 is wound, the anode parts 206 and the cathode parts 208, which are bare over an element end-face 205, face to each other in a state of being bent by the fold lines 246 in a facing direction, using a winding center 252 as the center, as depicted in FIG. 12A. Thus, as depicted in FIG. 12B, the anode parts 206 and the cathode parts 208 are folded toward the winding center 252 side through the fold lines 246 in order to achieve the connection with the anode current collector plate 212 and the connection with the cathode current collector plate 216, to form sections 206B, 206C, 208B and 208C.

Figure 12C:
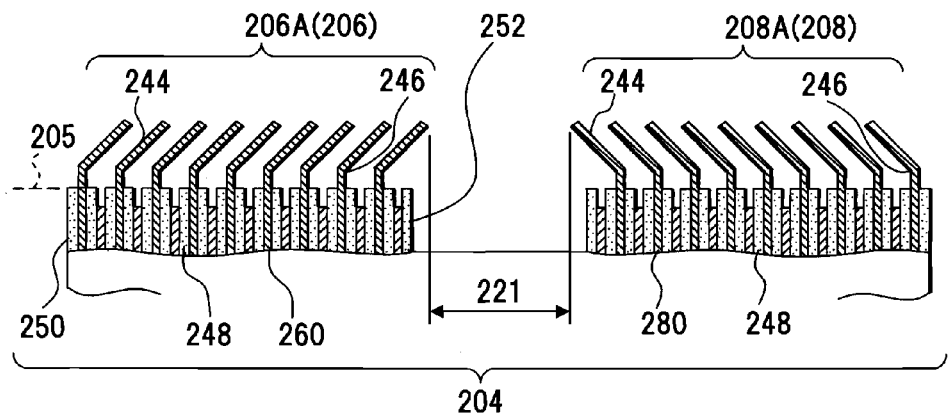

Also, as depicted in FIG. 12C, sections 206A and 208A are further bent over the element end-face 205 side through the fold lines 246.

The following effects are acquired according to this fifth embodiment.

(1) The more portions of a protrusion from electrode foil are, the more the internal resistance is reduced. If the portions of protrusions increase, it is difficult to be bent accurately because plural portions of protrusions pile in wound and laminated. Also, in a wound element, if portions of protrusions are sequentially provided along its circumferences, wrinkles are easily generated when protrusions are bent and folded, which makes connection with current collector plates difficult. On the contrary, as described above, if protrusions are accurately bent and folded, connection with current collector plates can be stabilized, and a capacitor whose resistance is low can be provided. That is, if folds are formed on electrode protrusion parts, the electrode protrusion parts can be accurately bent and folded. As a result, there occurs no wobble or the like in the connection with current collector plates, and the stable connection can be realized.

(2) Positions of folds are separated from the element end-face for a predetermined size. Thus, laser heat or spatters do(es) not transfer to the element side in laser welding on current collector plates, and thus, the influence on the element results in small one.

(3) Folds are formed easily because the folds are formed on protrusion parts before the capacitor element is formed.

(4) Folds are formed on electrode foil (uncoated parts) and after that, edge portions of the electrode foil are cut off to make protrusion parts. Thereby, the effect of positions of folds on the same line in the whole of protrusion parts is also acquired.

Sixth Embodiment

The sixth embodiment discloses control of laser irradiating power for a weld line. As described above, the manufacturing method of the capacitor 2 includes the steps of forming the anode part 6 and the cathode part 8 on the element end-face of the capacitor element 4, and respectively welding to connect the anode current collector plate 12 and the cathode current collector plate 16, to the anode part 6 and the cathode part 8.

In this connecting step, a weld line extending from a welding start point to a welding end point is set on a current collector plate, and power of a beam with which this weld line is irradiated is sequentially varied step by step to perform irradiation with a beam.

FIGS. 13 and 14 depict a weld line(s) and laser power according to the sixth embodiment.

Figure 13A:
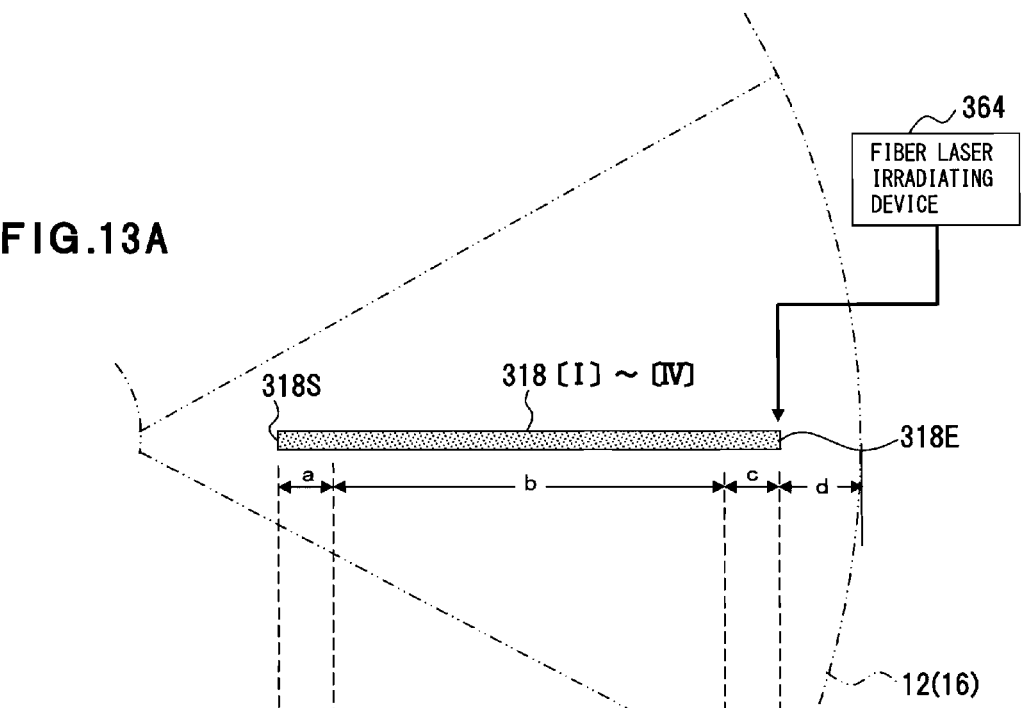
FIGS. 13A and 13B depict a weld line, laser power and an output power waveform according to the sixth embodiment.

In this welding by irradiation with a beam, as depicted in FIG. 13A, a weld line 318 on the anode current collector plate 12 or the cathode current collector plate 16 is set. Segments a, b and c are set between a welding start point 348S and welding end point 318E of this weld line 318. A segment d is set beyond the welding end point 318E.

A fiber laser irradiating device 364 as an example of a beam irradiating means is used for this laser welding. The weld line 318 is a part that is welded by irradiation with a laser. In this case, shielding gases such as an argon gas and a helium gas is used to carry out a welding process.

Figure 13B:
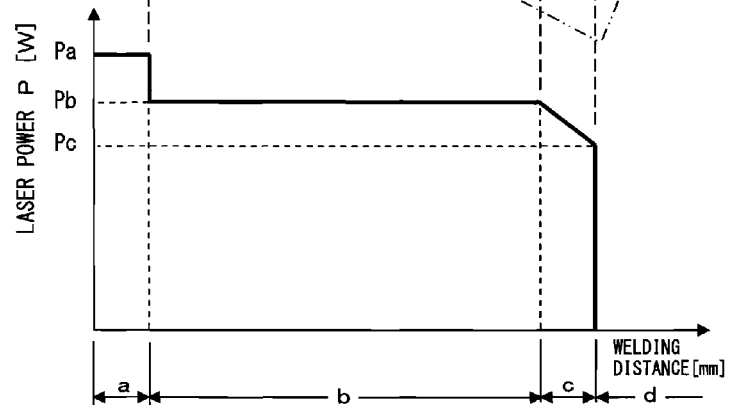

This irradiation with a laser by the fiber laser irradiating device 364 is carried out at the constant irradiating speed, and beam power for the weld line 318 is sequentially varied step by step. In this embodiment, as depicted in FIG. 13B, laser power P is set for a constant value of laser power Pa in the segment a, and of laser power Pb (<Pa) in the segment b. In the segment c, the laser power P is attenuated from the laser power Pb to laser power Pc (<Pb). The laser power Pa in the segment a is set for the largest value, which is, for example, in the range of 50 W to 3,000 W. The laser power Pb in the segment b is weaker than the laser power Pa, and is not more than 90% of the laser power Pa. The laser power Pc in the segment c is a smaller value than the laser power Pb, and is not more than 80% of the laser power Pa. In this case, a horizontal axis represents distance (mm) in FIG. 13B.

The power of a laser Pa with which the welding start point 318S is irradiated is set for the largest value. Shorter irradiating time than the segment b is set for the segment a, which is irradiated with a laser of the power Pa. Following the segment a, the segment b, which is the longest and is irradiated with a laser of the power Pb, is set. Shorter time than the segment b is set for the segment c. In this segment c, the laser power Pb is linearly attenuated to the laser power Pc. Like the above, it is preferable to attenuate laser power near the welding start point and welding end point. It is also preferable that there is more than one segment where laser power is attenuated.

The speed of laser scanning for the weld line 318 is the constant speed. For example, the speed may be the constant speed that is selected from the range of 300 mm/s to 3,000 mm/s. The scanning speed may be changed according to a segment.

As to a weld line, a plurality of weld lines may be set adjacent to each portion to be welded in the anode current collector plate 12 for the anode part 6 and in the cathode current collector plate 16 for the cathode part 8, to realize multiple welding. In this case, in the connecting step, weld lines extending from welding start points to welding end points are set in current collector plates. Irradiation with a beam may be carried out by sequentially varying power of a beam with which these weld lines are irradiated step by step.

Figure 14A:
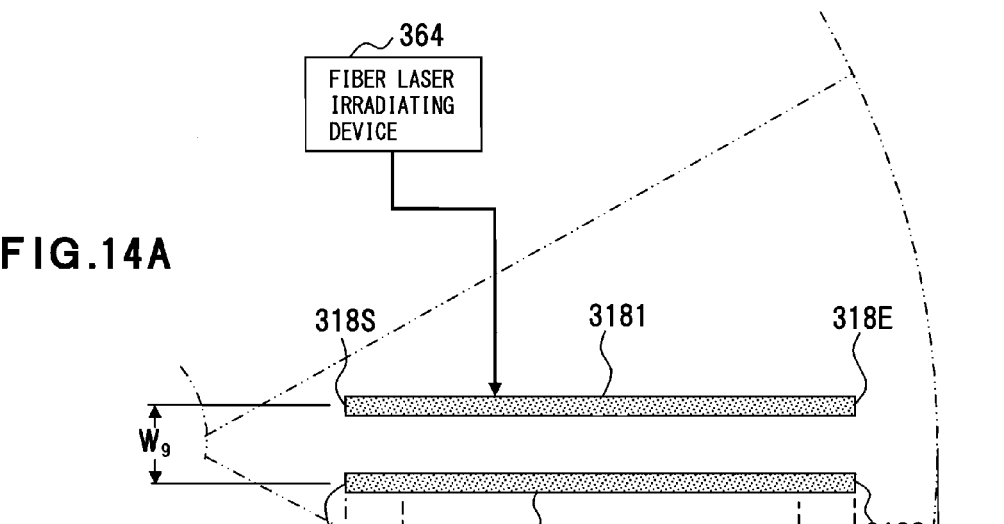
FIGS. 14A and 14B depict weld lines, the laser power and the output power waveform.
Figure 14B:
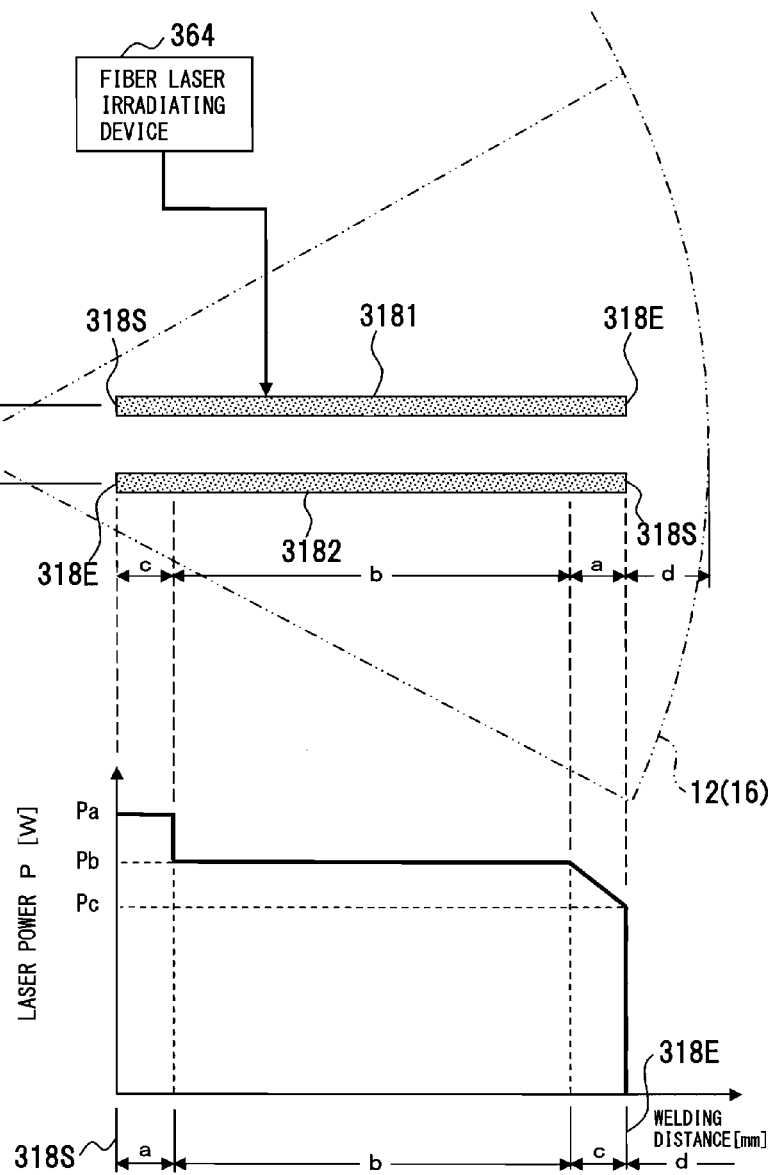

FIG. 14A depicts a case where weld lines 3181 and 3182, which is an example of a plurality of weld lines, are set in each welded part, adjacently to each other. Assuming that a distance between the weld lines 3181 and 3182 is $W_9$, the distance $W_9$ is set within 3 mm, for example. The weld lines 3181 and 3182 may overlap.

It is as described above that the weld lines 3181 and 3182 are individually welded by the above described fiber laser irradiating device 364. The start point 318S and the end point 318E are set for each of the weld lines 3181 and 3182. The above described segments a, b, c and d are also set for each of the weld lines 3181 and 3182 according to a direction of welding scanning. The way to carrying out welding scanning along the weld line 3181 is opposite to that along the weld line 3182. Laser power for each segment a, b and c of such weld lines 3181 and 3182 is set in FIG. 14B.

The following effects are acquired according to this sixth embodiment.

(1) Laser power for the weld line 318, which extends from the start point 318S to the end point 318E of laser welding for the anode current collector plate 12 or the cathode current collector plate 16, and the anode part 6 or the cathode part 8 of the capacitor element 4, is attenuated sequentially step by step. Thereby, welding energy applied to a current collector plate and an electrode protrusion part can be equalized, and the connectivity can be improved.

(2) At the start point 318S of irradiation with a laser, laser power is set high, and irradiation with a laser is carried out with this high laser power. The weld line 318 in the anode current collector plate 12 and the anode part 6, or in the cathode current collector plate 16 and the cathode part 8 for which irradiation with a laser is carried out, and the vicinity thereof are heated. That is, if irradiation with a laser is done along the weld line 318, a heated point moves successively to scanning of the irradiation with a laser as the scanning moves. Thus, the weld line 318 successively becomes a melting state. In this case, equalized laser power is not necessary to be set. Thermal energy that is brought by irradiation with a laser and is applied to welded parts is equalized even if laser power is attenuated sequentially step by step (the embodiment described above), or step by step or sequentially. Thus, the connectivity of the anode current collector plate 12 and the anode part 6, or of the cathode current collector plate 16 and the cathode part 8 can be improved.

(3) If laser power is kept a certain level, there appear points where thermal energy is excessive. If an electrode that forms an electrode protrusion part is thin, excessive concentration of thermal energy brings uneven melting, and the connectivity of a current collector plate and the electrode protrusion part becomes unstable. Such inconvenience can be avoided by the above described control of laser power, that is, attenuation of the power.

Seventh Embodiment

A seventh embodiment discloses an isolation distance between electrode parts, which is formed in the element end-face of a capacitor element, and adjustment of the isolation distance.

Figure 15A:
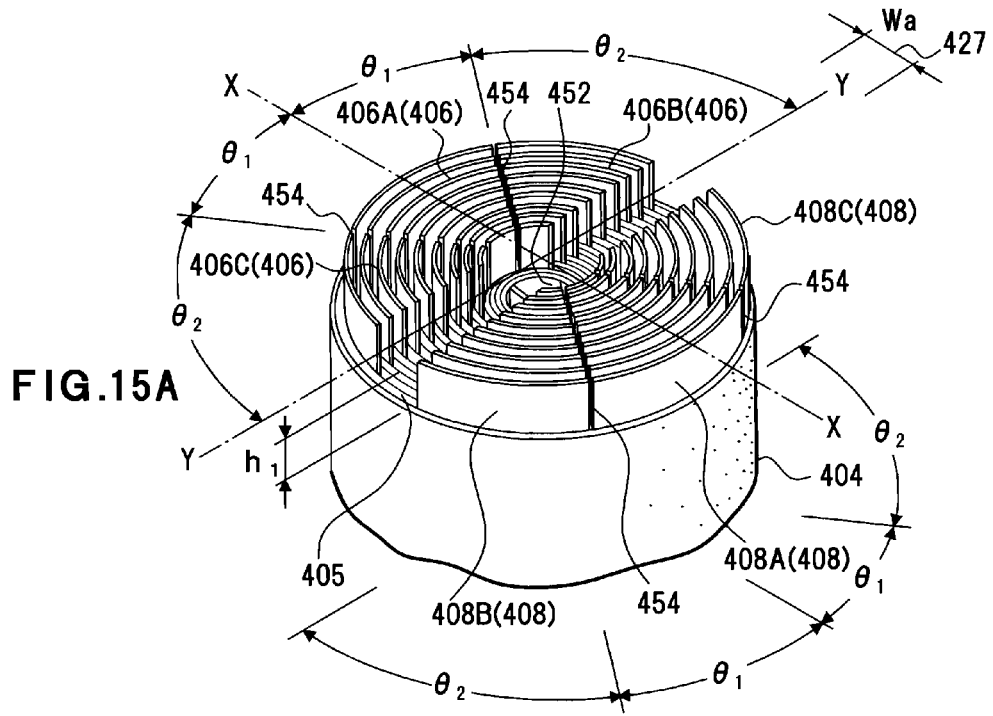
FIGS. 15A and 15B depict an example of an anode part and a cathode part of a capacitor element before and after the molding according to the seventh embodiment.
Figure 15B:
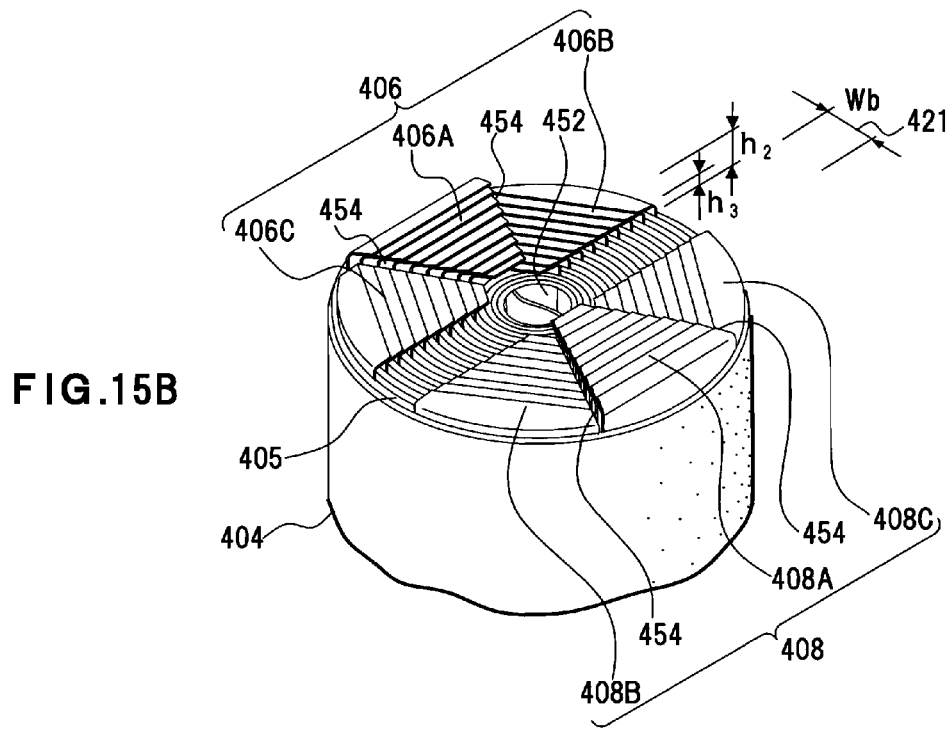

FIGS. 15A and 15B depict electrode protrusion parts and electrode parts, which are the electrode protrusion parts after processed.

In molding of these electrode parts, an anode part 406 or a cathode part 408 over an element end-face 405 of a capacitor element 404 as depicted in FIG. 15A is molding-processed so as to be in closely contact with the element end-face 405 of the capacitor element 404 as depicted in FIG. 15B before connected to an anode current collector plate 412 or a cathode current collector plate 416.

The anode part 406 and the cathode part 408 that form electrode protrusion parts are erected over the element end-face 405 of the capacitor element 404 as depicted in FIG. 15A. An isolation distance 427 for forming an isolation distance 421 of predetermined width is set between these anode part 406 and cathode part 408. If the width of the isolation distance 427 is Wa and the width of the isolation distance 421 is Wb, Wa>Wb is set, so that the isolation distance 421 is ensured even if the anode part 406 and the cathode part 408 are folded as described below. The width Wa is set wider than protruding width of an electrode body, that is, the anode part 406 or the cathode part 408 before folded. If the width of the isolation distance 427 is Wa and the folding width of the anode part 406 and cathode part 408 as described above is $W_8$, the relationship of the size of Wa and $W_8$ is Wa>$W_8$.

A Y axis is taken along the middle line of the isolation distance 427, and the X axis is taken along the line orthogonal to the Y axis. Angles $\theta_1$ and $\theta_2(>\theta_1)$ are set in each of the left and right of the X axis as the center, to make sections. A plurality of slits 454 are radially made along the line of angle $\theta_1$ from the X axis, using a winding center (core) 452 of the capacitor element 404 as the center. A plurality of sections 406A, 406B and 406C are formed in the anode part 406, which is divided thereinto by the slits 454. As well, a plurality of sections 408A, 408B and 408C are formed in the cathode part 408. For example, if the angle $\theta_1$ is set for 33 degrees, each section 406A and 408A is $2\theta_1$=66 degrees. The angle $\theta_2$ of each section 406B and 406C, which is formed with holding the section 406A, or that of each section 408B and 408C, which is formed with holding the section 408A, is set for $\theta_2$=57 degrees.

As to the depth of the slit 454, for example, the protruding length is set for height $h_1$ of the anode part 406 and cathode part 408. The relationship of the size between this height $h_1$ and the above described width Wa of the isolation distance 427 is Wa>$h_1$. The sections 406A, 406B and 406C of the anode part 406 and the sections 408A, 408B and 408C of the cathode part 408, which are set for this height $h_1$, are folded at their middle to be detruded toward the winding center 452 of the capacitor element 404, and thus compression molding is performed on them. Thereby, the sections 406A, 406B and 406C, and the sections 408A, 408B and 408C of the cathode part 408 are molded as depicted in FIG. 15B. In this embodiment, the sections 406B and 406C and the sections 408B and 408C are set as welded portions. Then, protruding height $h_2$ of the divisions 406A and 408A is set higher than height $h_3$ of the divisions 406B, 406C, 408B and 408C, so that the height of the sections 406A, 406B and 406C, and the sections 408A, 408B and 408C of the cathode part 408 is made to correspond to bending shapes of the anode current collector plate 412 and cathode current collector plate 416. The height size of the anode part 406 and cathode part 408 of the capacitor element 404 is controlled by compression molding for whole of the anode part 406 and the cathode part 408 toward the center of the capacitor element 404 like the above. In this embodiment, compression molding is performed on the sections 406B and 406C of the anode part 406 to form stable flat connecting faces (that is, welded faces); after that, compression molding is also performed on the section 406A, which is not a connecting face, so that the height size of borders, which are made by the overlap between the sections 406A and 406B, and the sections 406A and 406C, is controlled.

In the molding step of the anode part 406 and the cathode part 408, after the capacitor element 404 is wound, the anode part 406 and the cathode part 408, which are bare over the element end-face 405, face to each other in a state of being bent through fold lines, using the winding center 452 as the center, as described above. Thus, the sections 406B, 406C, 408B and 408C are folded toward the winding center 452 side through the fold lines 246 (FIGS. 11B to 11D) in order to achieve the connection with the anode current collector plate 412 and the cathode current collector plate 416.

After the sections 406B, 406C, 408B and 408C are folded, the section 406A and the section 408A may be folded over the element end-face 405 through fold lines.

Like the above, adjustment of the isolation distance 427 can prevent a short circuit between electrodes, in combination with achievement of the reduced resistance, and can realize a capacitor of high reliability.

Eighth Embodiment

In the above embodiments, as depicted in FIGS. 2 and 4, connecting areas are ensured on both faces of each current collector plate; a welded area for an external terminal is set on the top face and welded areas for an electrode of the capacitor element is set on the bottom face. Positions of these welded areas are varied between both faces, to achieve the facilitation of welding procedures. Over a current collector plate, element connecting areas that hold a terminal connecting area are set. In short, three areas are set. However, a current collector plate may not be divided into three areas. A current collector plate may be divided into two areas, or more than three areas.

Ninth Embodiment

A ninth embodiment discloses the control of an irradiating angle of laser welding.

Figure 16:
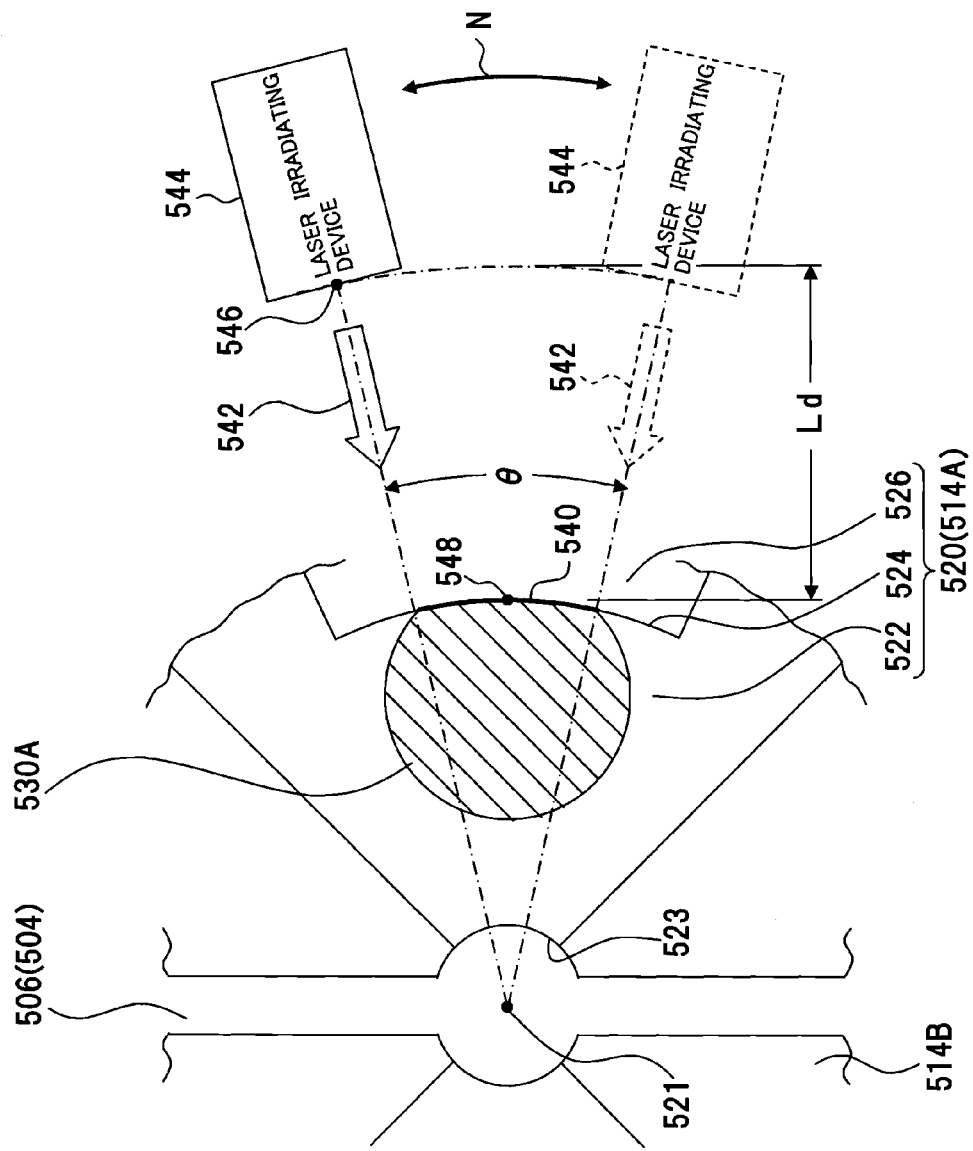
FIG. 16 depicts an example of irradiating a current collector plate and an external terminal with a laser according to the ninth embodiment.

FIG. 16 exemplifies a laser irradiating angle and welded faces according to the ninth embodiment.

Current collector plates 514A and 514B are placed on the basis of an element center 521 of an element end-face 506 of a capacitor element 504, and are connected to an anode part 508 or a cathode part 510 of the capacitor element 504. A connecting face 524 of a terminal welding part 520 of each current collector plate 514A and 514B constitutes an arcuate face based on the element center 521. As depicted in FIG. 16, a connecting face 540 of an anode terminal 530A or a cathode terminal 530B, which is placed on a terminal placing face 522, is made to coincide with the connecting face 524. A laser irradiating device 544 is placed, so that a laser emission part 546 thereof faces toward the connecting faces 524 and 540.

If distance between the laser emission part 546 and a laser irradiated point 548 of the connecting faces 524 and 540 is Ld, the distance Ld can be kept even if the laser irradiating device 544 is rotated in the direction of an arrow N, around the element center 521 as the rotation center. Assuming that the laser irradiating device 544 uses the laser irradiated point 548 as the center and has a rotation angle θ, and that the welded range is set for this rotation angle θ, irradiation with a laser 542 of the constant distance Ld can be operated uniformly on the connecting faces 524 and 540, to be able to perform welding. The distance Ld of the irradiation with a laser 542 is constant, the irradiation with a laser 542 can be stably and sequentially performed, a uniform welding process can be performed, and the reliability of the connection can be improved. In this structure, the capacitor element 504 may be rotated around the element center 521 as the rotation center to perform welding instead of the rotational movement of the laser irradiating device 544.

Concerning an example of this terminal connecting step, the irradiation with a laser 542 is performed while the laser irradiating device 544 is rotated about the element center 521 of the capacitor element 504 by predetermined angle θ. Then, the anode terminal 530A and the current collector plate 514A are welded. The capacitor element 504 is reversed (half-turned) then, and is pointed toward the laser emission part 546, to arrange the connecting faces 524 and 540 of the cathode terminal 530B and the current collector plate 514B, which face to the laser irradiating device 544. In this situation, the laser irradiating device 544 is pointed to the element center 521 and is rotated by above described predetermined angle θ, and the irradiation with a laser 542 is performed to carry out welding.

Figure 17:
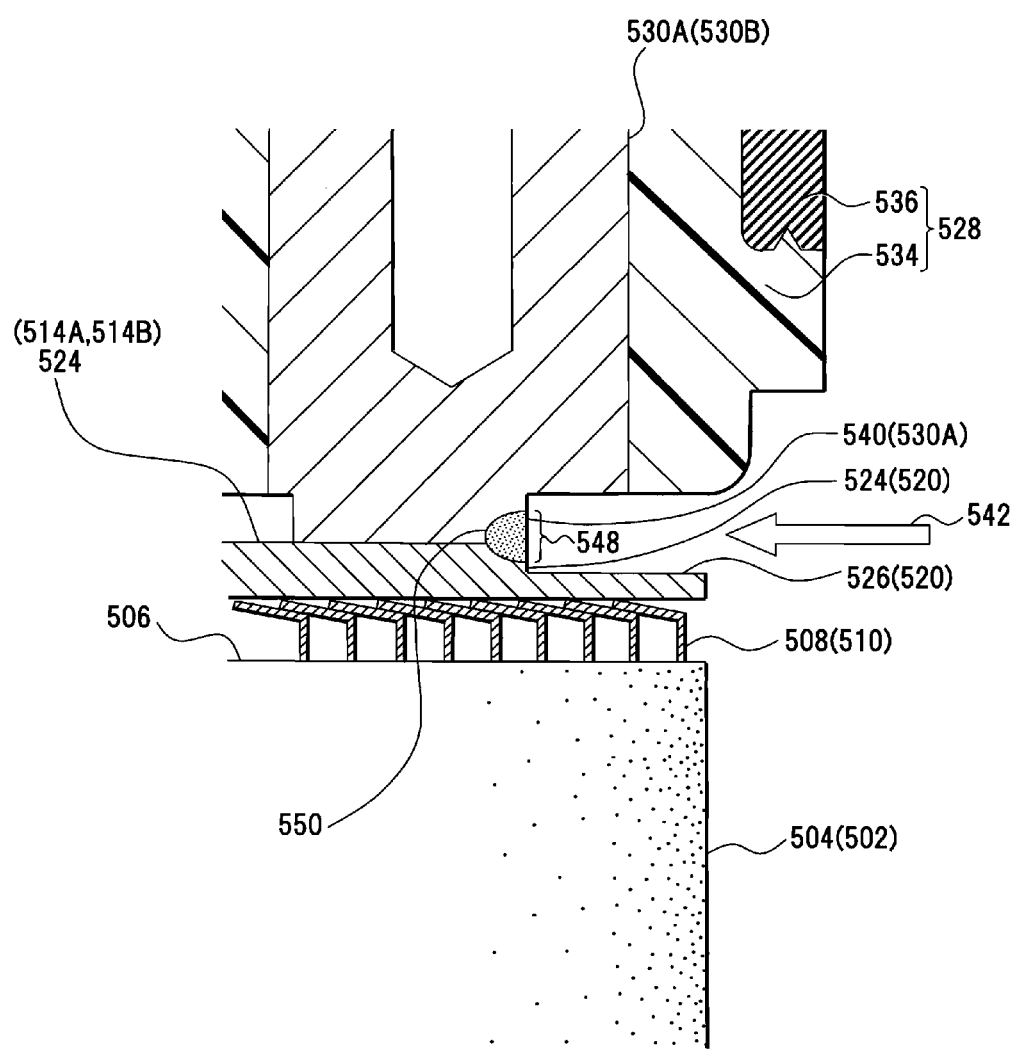
FIG. 17 depicts an example of welding a current collector plate to an external terminal.

As to welded portions by this laser welding process, as depicted in FIG. 17, the connecting faces 524 and 540 are uniformly welded, and the anode terminal 530A (cathode terminal 530B) and the current collector plate 514A (514B) are connected by a welded part 550. In this welding, the irradiation with a laser 542 is performed on the laser irradiated point 548. This irradiation with a laser 542 is carried out in the atmosphere of inert gases such as an argon gas.

The anode part 508 (cathode part 510) and the capacitor element 504 can be protected from flying objects generated from the irradiation with a laser 542 and laser welding because an element cover 526 that each current collector plate 514A and 514B includes covers the anode part 508 (cathode part 510) of the capacitor element 504 side.

The following effects are acquired according to this ninth embodiment.

(1) A second connecting face that matches a first connecting face of a current collector plate, which is connected to a capacitor element, is provided for a terminal member, and these first and second connecting faces are welded. Thus, the connection of a current collector plate and a terminal member can be facilitated, and the reliability of the connection can be improved.

(2) The accuracy of the laser welding or electron beam welding can be improved.

(3) The welding step can be simplified, and the expedition of the connecting process can be achieved.

Tenth Embodiment

A tenth embodiment describes a process including polarity discrimination of electrode protrusion parts of a capacitor element.

Figure 18:
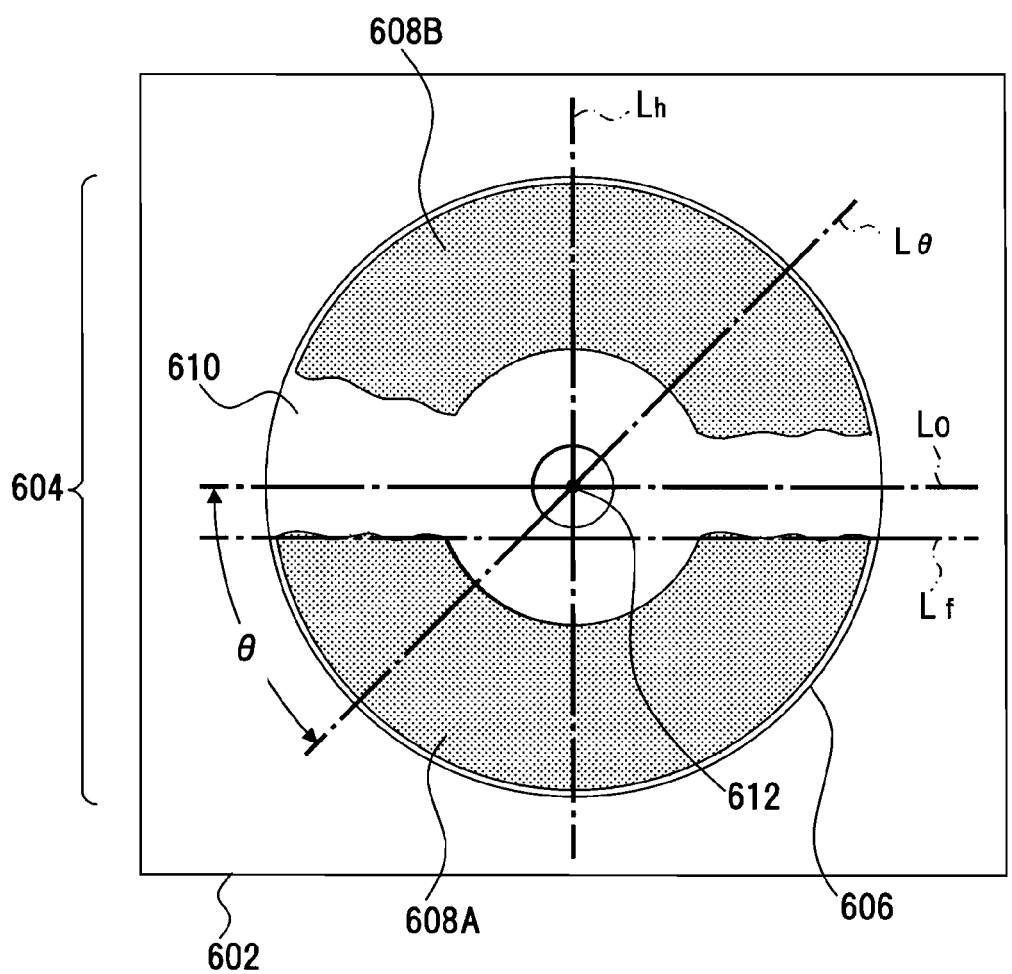
FIG. 18 depicts an image of an element end-face and a process for the image according to the tenth embodiment.

FIG. 18 will be referred to concerning the procedures for this process. FIG. 18 depicts image data and a process for the image data. The structure depicted in FIG. 18 is an example, and the present invention is not limited to such a structure.

These processing procedures are an example of the capacitor, and the manufacturing method and manufacturing program of this capacitor of the present invention. An image 602 depicted in FIG. 18 is image data that is obtained by the photography of an element end-face 606 of a capacitor element 604. In order to make the explanation simple, common reference numerals are assigned to image data, a display image generated from the image data (hereinafter simply referred to as "image") and their real image.

A pair of electrode protrusion parts 608A and 608B, which hold an isolation distance 610, is displayed over the element end-face 606 that is displayed on this image 602. In the real capacitor element 604, parts of electrode foil of anode and cathode sides of the capacitor element 604, each of which has different width according to the winding diameter, are stuck out of the element end-face 606, to form the electrode protrusion parts 608A and 608B, which are arcuate and the areas and shapes of which are different from each other. The electrode protrusion parts 608A and 608B are collectivity of the edges of the electrode foil, and are electrode foil, that is, metallic bodies. The element end-face 606 is covered by the edges of separators, which are set wider than the width of the electrode foil in the center direction in order to insulate the electrode foil. The covered portions are portions of higher brightness than the electrode protrusion parts 608A and 608B, and for example, are white. Therefore, over the element end-face 606, the electrode protrusion parts 608A and 608B have lower brightness, and the rest portions have higher brightness. On the image 602 that represents the element end-face 606, the shape of the element end-face 606 and the areas and shapes of the electrode protrusion parts 608A and 608B are clearly displayed due to their contrast. In a case of color display, a color image having different brightness is obtained on the image 602.

On this image 602, the electrode protrusion parts 608A and 608B, the shapes and areas of the end-faces of which are different from each other, are displayed. The shapes of the electrode protrusion parts 608A and 608B can be identified by outlines that separate the electrode protrusion parts 608A and 608B from the other parts according to difference of brightness. The areas of the electrode protrusion parts 608A and 608B are portions of lower brightness within the outlines, which separate the electrode protrusion parts 608A and 608B from the other parts according to difference of brightness. For example, these portions can be calculated using distribution of pixels (dot map), which constitute the image 602.

Like the above, the electrode protrusion parts 608A and 608B can be discriminated from each other by either one or both of their areas and shapes, using the image 602. That is, a polarity that is set for each electrode protrusion part 608A and 608B can be discriminated by discriminating between the electrode protrusion parts 608A and 608B through either one or both of their areas and shapes. In this embodiment, the areas of the end-faces are used for this polarity discrimination as identification information on the electrode protrusion parts 608A and 608B. This identification information is obtained from the image 602.

Following this identification of the electrode protrusion part 608A, the position of a baseline Lf is calculated by data processing on the image, the baseline Lf is generated along the calculated position, the position of a center line Lo is calculated based on this baseline Lf, and the center line Lo is generated along the calculated position. In this embodiment, the edge of the electrode protrusion part 608A that is nearest to an element center 612 side, is recognized, and the baseline Lf is generated on the image 602 based on this recognition as depicted in FIG. 18. A position of this baseline Lf is generated in the vicinity of the border between the electrode protrusion part 608A and the isolation distance 610, but may be within the isolation distance 610.

Based on this baseline Lf, the center line Lo passing through the element center 612 is generated in parallel to the baseline Lf. That is, the center line Lo passes through the element center 612, and is formed within the isolation distance 610. An orthogonal line Lh that is orthogonal to these baseline Lf and center line Lo and passes through the element center 612 may be also calculated, generated and displayed.

Following the generation of these baseline Lf and center line Lo, a shifting angle where the center line Lo shifts from a positioning angle of the real capacitor element 604, that is, a displacing angle θ is calculated. This angle θ is correction information on an angular position of the capacitor element 604. Based on this correction information, that is, by the medium of processing for the image obtained from the capacitor element 604, an angular position of the capacitor element 604 can be adjusted. Thereby, the adjustment of the angular position can be automated.

Eleventh Embodiment

An eleventh embodiment describes a capacitor manufacturing step, which includes obtainment of an image representing the element end-face and processing for the image (tenth embodiment).

Figure 19:
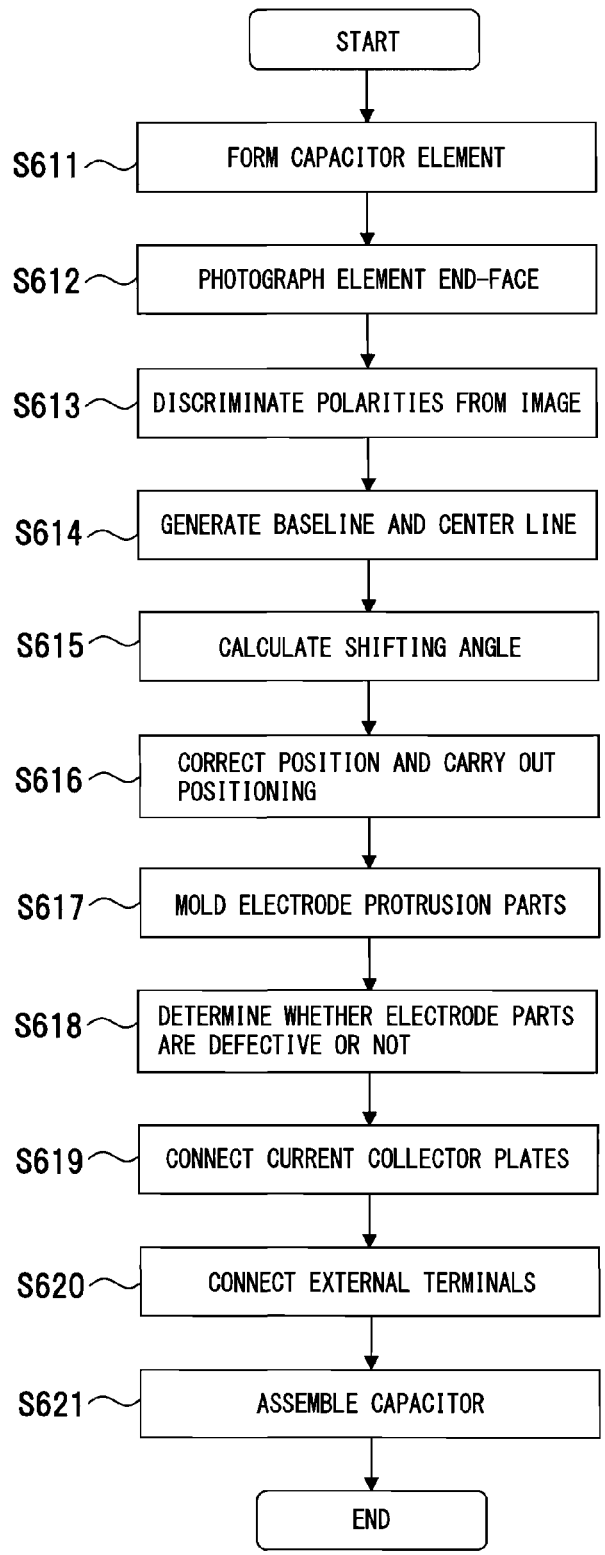
FIG. 19 is a flowchart depicting an example of a capacitor manufacturing step according to the eleventh embodiment.

FIG. 19 will be referred to concerning this capacitor manufacturing step. FIG. 19 depicts an example of the capacitor manufacturing step.

The manufacturing step depicted in FIG. 19 is an example of the capacitor, or the manufacturing program or manufacturing method of the capacitor of the present invention. In this manufacturing step, the capacitor element 604 is formed (step S611). In this forming step, electrode foil of the anode and cathode sides is stuck out of the element end-face 606 side, and the electrode foil forms the electrode protrusion parts 608A and 608B (FIGS. 21A to 21C and 22).

Figure 20:
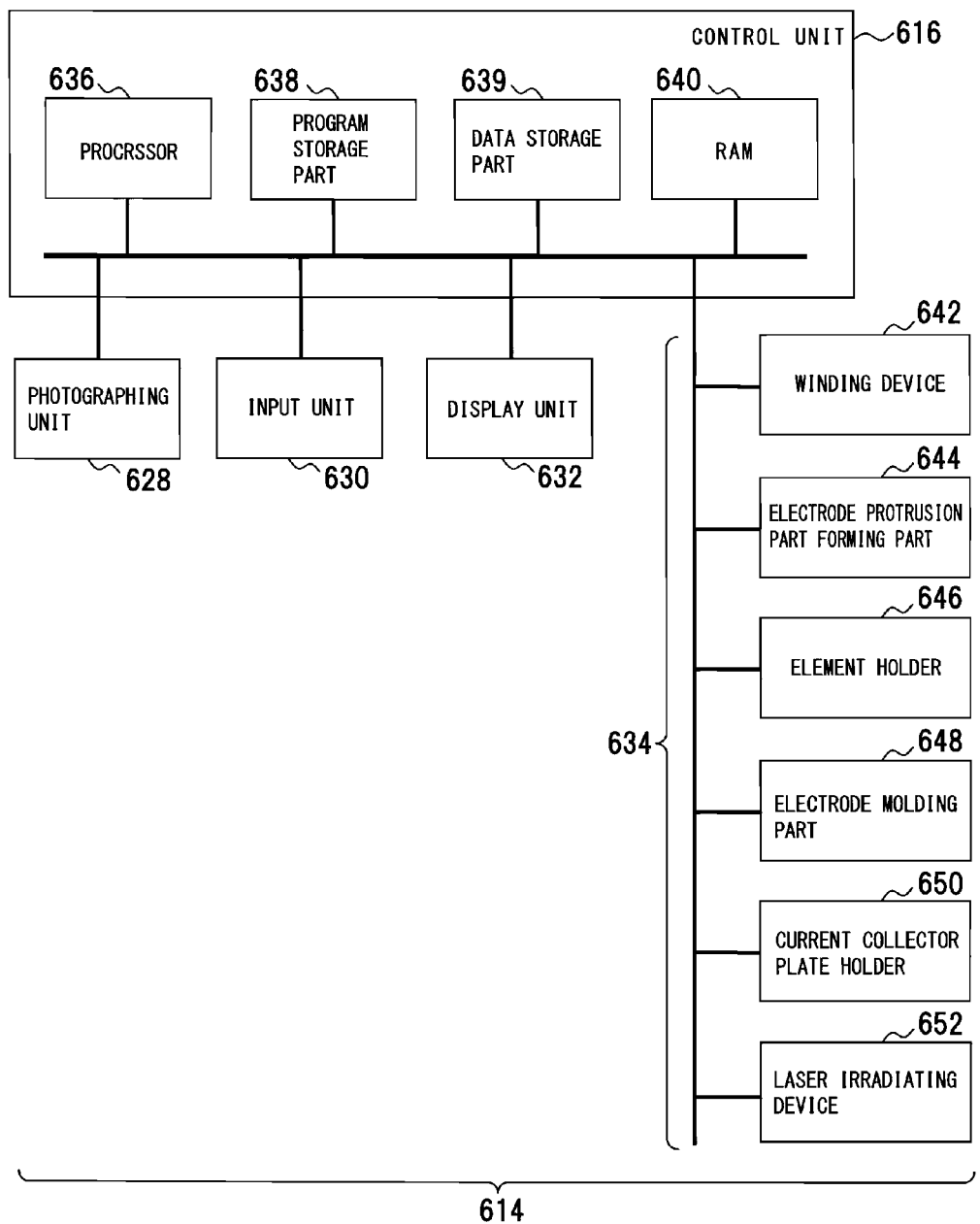
FIG. 20 depicts an example of a capacitor manufacturing system.

The element end-face 606 of the capacitor element 604 is photographed (step S612). The image 602 of the element end-face 606 is obtained by a control unit 616 of a capacitor manufacturing system 614 (FIG. 20).

In the control unit 616, polarities are discriminated using areas of the end-faces of the electrode protrusion parts 608A and 608B from the image 602 as identification information (step S613). In this polarity discrimination, the electrode protrusion parts 608A and 608B, and their shapes (outlines) are recognized from the contrast on the image 602 of the element end-face 606 of the capacitor element 604 (FIG. 18), and areas of end-faces, which are enclosed by the outlines, are calculated. The areas of the electrode protrusion parts 608A and 608B are compared with each other, and their polarities are discriminated from a result of the comparison of the areas (step S613). For example, in this case, the end-face having a larger area is defined as the end-face of the anode side.

After this polarity discrimination, the baseline Lf and the center line Lo are generated on the image 602 (step S614). Prior to the generation of the baseline Lf, the edge of the electrode protrusion part 608A (edge that face toward the electrode protrusion part 608B) is recognized. A position of the baseline Lf is calculated based on this edge, and the baseline Lf is generated along that position. The center line Lo that passes through the element center 612 is generated in parallel to this baseline Lf.

The generation of this center line Lo allows the shifting angle θ from the positioning angle of the capacitor element 604 to be calculated (step S615). When the center line Lo of the element end-face 606 of the capacitor element 604 that is detected is fixed, the shifting angle θ from the positioning angle of the capacitor element 604, which is connected to current collector plates 618A and 618B (FIG. 24), can be calculated. This angle θ is outputted as correction information.

Positioning is carried out via the correction of a position of the capacitor element 604, using this correction information (step S616), to mold the electrode protrusion parts 608A and 608B (step S617). This molding of the electrode protrusion parts 608A and 608B forms electrode parts 620A of the anode side and 620B of the cathode side, which are to be connected to the current collector plates 618A and 618B.

Determination whether these electrode parts 620A and 620B (FIG. 24) are defective or not is executed (step S618). This determination of defectiveness is a process for excluding a defective product, which has, for example, short circuits between the electrode parts 620A and 620B.

The electrode parts 620A and 620B are positioned under the current collector plates 618A and 618B, and the connection between them is carried out through welding (step S619). External terminals in a sealing plate 622 are connected to the current collector plates 618A and 618B according to polarities identified by the above described identification information (step S620). In this case, an anode terminal 624A is connected to the current collector plate 618A of the anode side and a cathode terminal 624B is connected to the current collector plate 618B of the cathode side.

Like the above, after the capacitor element 604 and the sealing plate 622 are integrated, a capacitor is assembled (step S621).

According to such a structure, the areas of the end-faces of the electrode protrusion parts 608A and 608B are identified by the image of the element end-face 606 of the capacitor element 604 before molding, and polarity discrimination is executed by using the areas of the end-faces as identification information. Thus, the polarity discrimination can be automated. Also, the shifting angle θ of the capacitor element 604 is detected based on the baseline Lf and the center line Lo, which are generated on the image of the element end-face 606. Thus, the automation of position correction can be achieved, using this angle θ as correction information.

According to such a manufacturing step, the automated manufacture can be achieved, including obtainment of the image 602, calculation of the baseline Lf, the center line Lo, and the angle θ, which is an angle between an element angle and a positioning angle, and position adjustment of the capacitor element 604 based on this shifting angle. This manufacturing step can contribute to the rapid manufacture and the manufacture of capacitors that are products with high accuracy, such as the accuracy of polarity.

FIG. 20 will be referred to concerning this capacitor manufacturing system. FIG. 20 is an example of a capacitor manufacturing system.

The capacitor manufacturing system 614 is an example of the capacitor manufacturing method and the capacitor manufacturing program. In the capacitor manufacturing system 614, control is carried out including the above described obtainment of the image 602 of the element end-face 606 and processing for the image (tenth embodiment). As depicted in FIG. 20, this capacitor manufacturing system 614 includes the above described control unit 616, a photographing unit 628, an input unit 630, a display unit 632 and various driving mechanisms 634.

The control unit 616 is configured by computers. In this embodiment, the control unit 616 includes a processor 636, a program storage part 638, a data storage part 639 and a RAM (Random-Access Memory) 640.

For example, the processor 636 is configured by a CPU (Central Processing Unit), and runs OSs (Operating System) and various programs such as a capacitor manufacturing program, which are stored in the program storage part 638. In running these programs, the image is taken, information on the image is generated, a shifting angle is calculated, the position of the capacitor element 604 is corrected, control information is outputted, and driving output for the various driving mechanisms 634 is generated. The program storage part 638 and the data storage part 639 are configured by recording media such as hard discs, and OSs and the above described programs are stored in the program storage part 638. Image data and reference data are stored in the data storage part 639. For example, various kinds of data are stored in the data storage part 639 such as image data taken in from the photographing unit 628, a baseline and a center line on the image, which are generated by the control, and the angle θ. The RAM 640 is used as a work area for storing data that is still being calculated, and for running the above described programs.

The photographing unit 628 is an example of a photographing means. For example, a digital still camera constitutes the photographing unit 628. Under the control of the processor 636, the photographing unit 628 photographs the element end-face 606 of the capacitor element 604, and outputs image data to the control unit 616.

For example, input devices including keyboards, touch panels and mouses constitute the input unit 630.

For example, liquid crystal displays (LCD) constitute the display unit 632. The display unit 632 constitutes a display means for the above described image 602 (FIG. 18).

The above described various driving mechanisms 634 include a winding device 642, an electrode protrusion part forming part 644, an element holder 646, an electrode molding part 648, a current collector plate holder 650, and a laser irradiating device 652.

The winding device 642 winds electrode foil of the anode and cathode sides, between which a separator is sandwiched, to form the capacitor element 604. The electrode protrusion part forming part 644 accompanies the winding device 642, and molds edge sides of the electrode foil of the anode and cathode sides, which is to be wound, so that the edge sides have predetermined intervals, to form the electrode protrusion parts 608A and 608B.

The element holder 646 holds the capacitor element 604, which is wound. The electrode molding part 648 folds the electrode protrusion parts 608A and 608B, which are over the element end-face 606 of the capacitor element 604, down on the element end-face 606, to mold the electrode protrusion parts 608A and 608B into the electrode parts 620A and 620B.

The current collector plate holder 650 holds the current collector plates 618A and 618B, which are connected to the electrode parts 620A and 620B of the element end-face 606, in predetermined positions. The element holder 646 that holds the capacitor element 604 modifies the angular position, using the above described correction information.

The laser irradiating device 652 welds the current collector plates 618A and 618B, which are held by the current collector plate holder 650, to the electrode parts 620A and 620B of the capacitor element 604 through irradiation with a laser, and the electrical connection is carried out.

Figure 21:
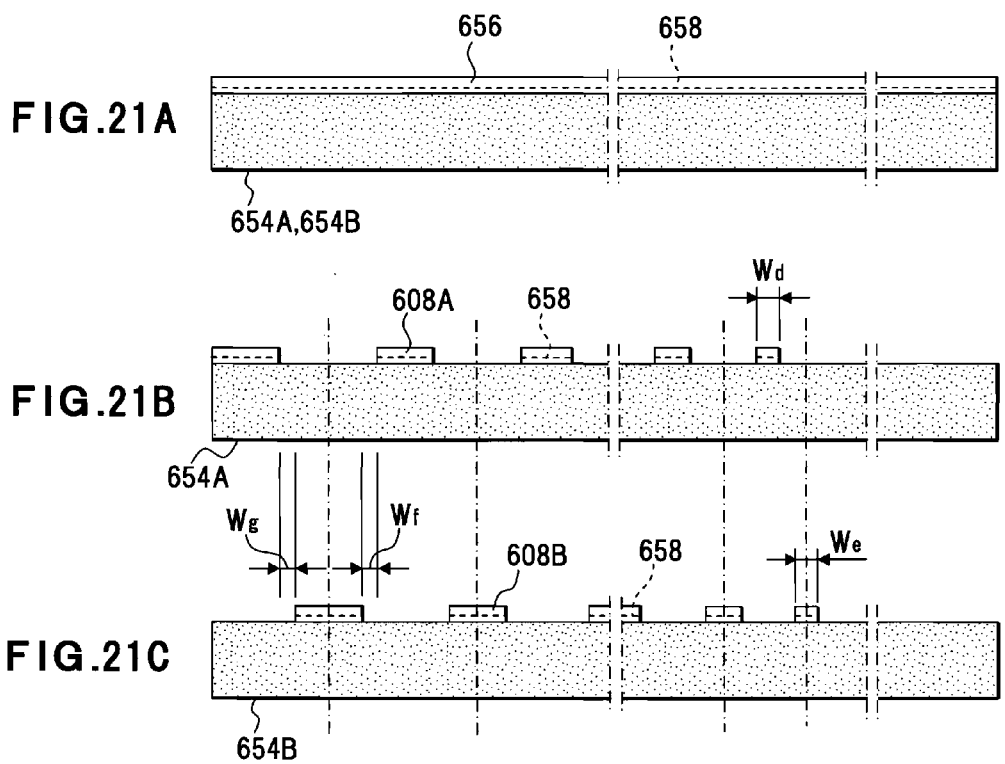
FIGS. 21A to 21C depict an example of electrode foil and processing of the electrode foil.

FIGS. 21A to 21C will be referred to concerning forming of the capacitor element 604 and the electrode protrusion parts 608A and 608B. FIGS. 21A to 21C depict electrode foil. In FIGS. 21A to 21C, parts common to those in FIG. 18 are denoted by the same reference numerals.

Electrode foil 654A and 654B depicted in FIG. 21A, which are electrode bodies of the anode and cathode sides, are used for the capacitor element 604. For example, aluminum foil is used for base materials of the electrode foil 654A and 654B. The electrode foil 654A and 654B have strip-shaped bodies of constant width. A polarized electrode, which includes active materials such as activated carbon and binding agents, is formed over both sides of each electrode foil 654A and 654B. An uncoated part 656 of constant width is formed along one edge of each electrode foil 654A and 654B. This uncoated part 656 is for forming the electrode protrusion parts 608A and 608B. This uncoated part 656 is a portion where a polarized electrode is not formed.

A fold 658 that has constant distance from the edge is formed for the uncoated part 656 of each electrode foil 654A and 654B. This fold 658 is a marking-off line as described above, and prevents buckling in folding. A groove constitutes this fold 658. The cross-sectional shape of the fold 658 may be a triangle, rectangle, or curve (R). For example, a method such as pressing, using a laser, and cutting may be used for forming this fold 658. While only one fold 658 may be formed as depicted in FIG. 21A, a plurality of folds 658 may be formed according to the width of the uncoated part 656. The fold 658 may be formed on either one side or both sides of the uncoated part 656. The fold 658 as one example is formed, so that the side which faces toward the element center 612 of the element end-face 606 (winding center if the element is a wound element. FIG. 18) is the inside in folding.

As depicted in FIG. 21B, a plurality of portions of the electrode protrusion part 608A, each of which has different width Wd in the longer direction of the electrode foil 654A, are formed by the uncoated part 656 of the electrode foil 654A. Similarly, as depicted in FIG. 21C, a plurality of portions of the electrode protrusion part 608B, each of which has different width We in the longer direction of the electrode foil 654B, are formed by the uncoated part 656 of the electrode foil 654B.

In a case of a wound element like the capacitor element 604, the forming position is set, so that the electrode protrusion parts 608A and 608B hold the isolation distance 610 (FIG. 22) in the diameter direction to face toward the element center 612. The width Wd and the width We are set so as to linearly widen as the winding radius lengthens. The end-faces of the electrode protrusion parts 608A and 608B are varied, and areas thereof are set, so that polarity discrimination can be carried out. As to the setting of the areas, the width We of an electrode protrusion part of the electrode protrusion part 608B side is set narrower than the width Wd of the electrode protrusion part 608A. Thus, as depicted between FIGS. 21B and 21C, space widths, Wg and Wf are varied.

Figure 22:
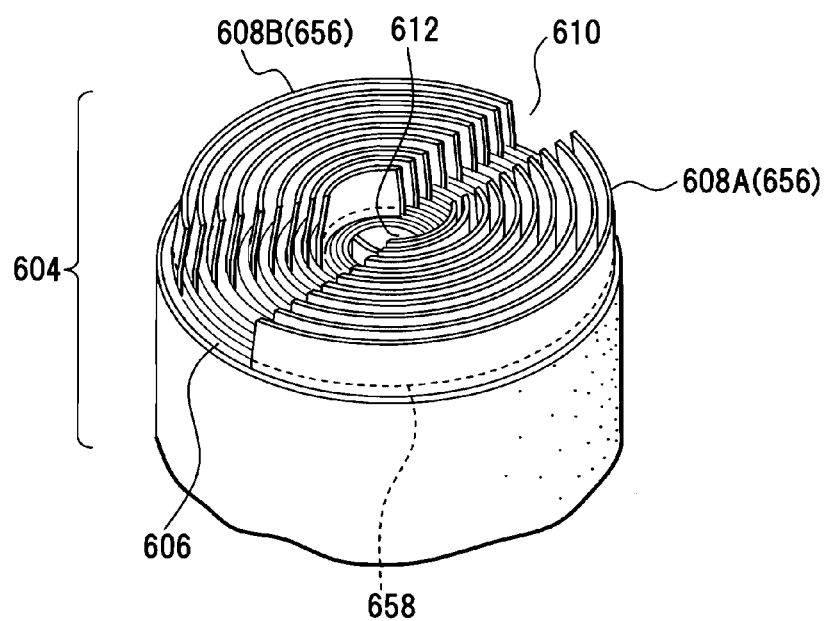
FIG. 22 depicts an example of the element end-face where electrode protrusion parts are formed.

According to such a structure, as depicted in FIG. 22, the electrode protrusion parts 608A and 608B are formed in turn every half a wind of the element end-face 606 of the capacitor element 604. The electrode protrusion parts 608A and 608B, the areas of the end-faces of which are varied, are formed. The isolation distance 610 has constant width between one edge side of each electrode protrusion part 608A and 608B, and is sequentially spread toward the outer circumference of the capacitor element 604 between the other edge side of each electrode protrusion part 608A and 608B. The electrode protrusion parts 608A and 608B can also be folded toward the element center 612 side along the folds 658.

Figure 23:
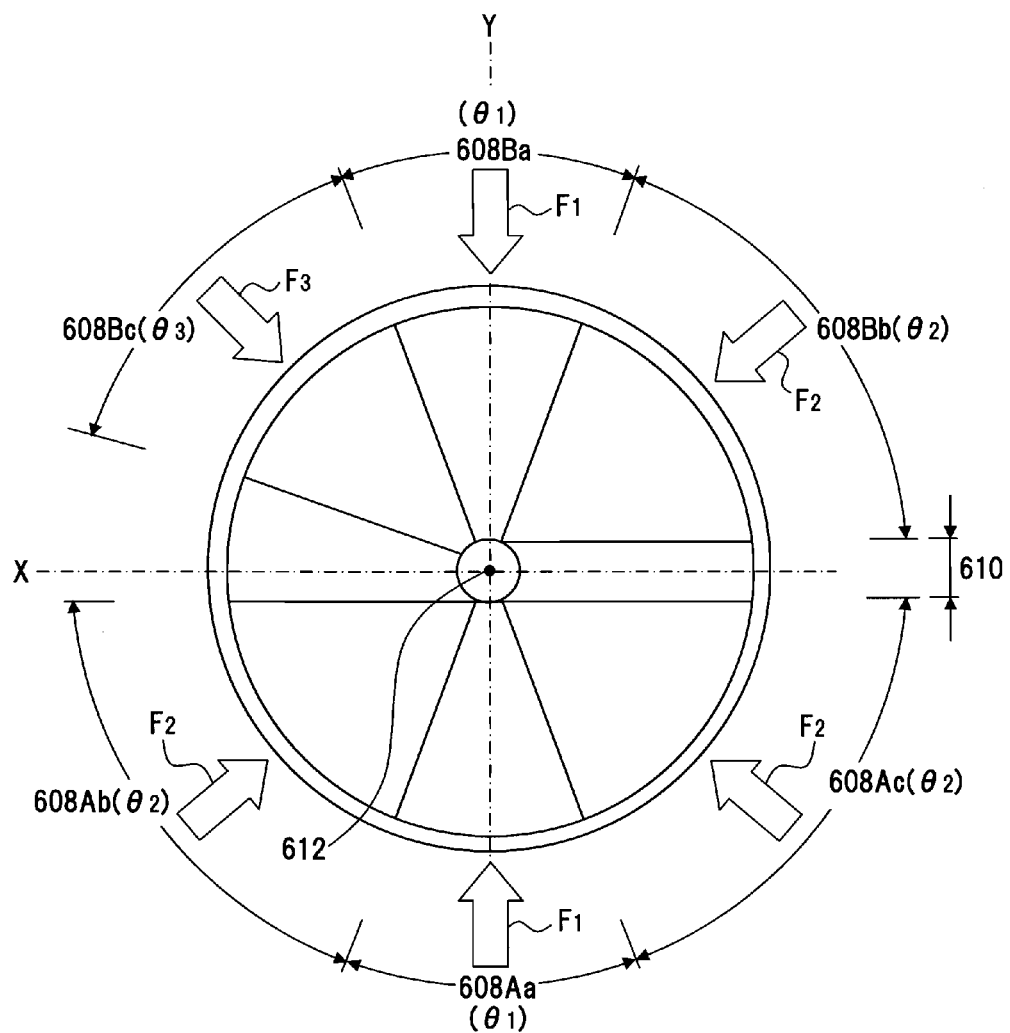
FIG. 23 depicts processing procedures for the electrode protrusion parts.

FIG. 23 will be referred to concerning the electrode protrusion parts and molding the electrode protrusion parts. FIG. 23 exemplarily depicts the element end-face and the electrode protrusion parts depicted in FIG. 22.

Molding pressure F1 in the direction of the center axis (Y axis), which is perpendicular in the drawing, is acted on the electrode protrusion parts 608A and 608B from the circumference of the capacitor element 604 toward the element center 612 to fold the electrode protrusion parts 608A and 608B, and the electrode protrusion parts 608A and 608B are molded to be flat. These molding ranges are defined as sections 608Aa and 608Ba, and each angle of the sections 608Aa and 608Ba is defined as $\theta_1$. For example, $\theta_1$ is 40 degrees.

An angle $\theta_2$ of each section 608Ab and 608Ac, which is the rest after this molding, equals to $\{(180-\theta_1)\div2\}$ if the whole angle of the electrode protrusion part 608A is defined as 180 degrees. For example, this $\theta_2$ is 70 degrees. Molding pressure F2 is acted on each of these sections 608Ab and 608Ac from the circumference of the capacitor element 604 toward the element center 612. Thus, the sections 608Ab and 608Ac are folded, and molded to be flat.

If the whole angle of the electrode protrusion part 608B is defined as 180 (degrees)$-\theta_x$, which equals to 170 (degrees), as an example, the angle $\theta_2$ of the section 608Bb, which is another section, is defined as $\{(180-\theta_1)\div2\}$ as well as the section 608Ab of the electrode protrusion part 608A. That is, $\theta_2$ is 70 degrees. If an angle $\theta_3$ of the section 608Bc equals to $(170-\theta_2-40)$, the angle $\theta_3$ is narrowed as much as the area of the electrode protrusion part 608B is lessened. In this case, the angle $\theta_3$ as the example is 60 degrees.

The molding pressure F2 and F3 are acted on such sections 608Bb and 608Bc from the circumference of the capacitor element 604 toward the element center 612. Thereby, the sections 608Bb and 608Bc are folded and molded to be flat.

The molding pressure F1 in linearly opposite directions is acted on the sections 608Aa and 608Ba, the molding pressure F2 in linearly opposite directions is acted on the sections 608Ab and 608Bb, the molding pressure F2 is acted on the section 608Ac, and the molding pressure F3 is acted on the section 608Bc. Thus, as depicted in FIG. 24, the electrode parts 620A and 620B, which constitute balanced flat molded faces, can be formed over the element end-face 606 of the capacitor element 604.

Figure 24:
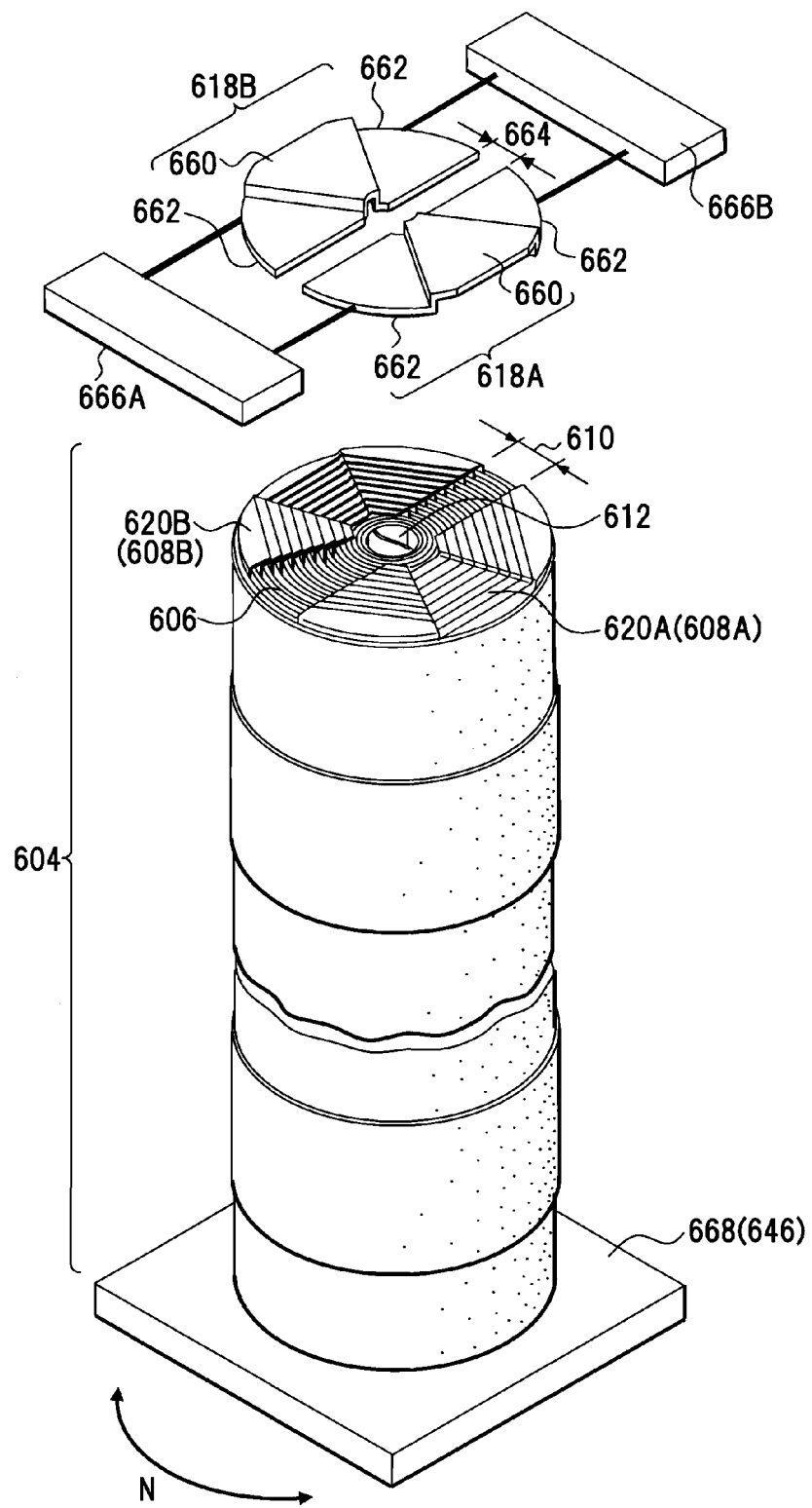
FIG. 24 is a perspective view depicting an example of adjustment of a position of the capacitor element to current collector plates.

FIG. 24 will be referred to concerning positioning and connection of the electrode parts and the current collector plates. FIG. 24 depicts holding and positioning of the current collector plates.

As depicted in FIG. 24, the current collector plates 618A and 618B have the same shape, and are formed in substantially semicircular shapes, between which the isolation distance 610 is sandwiched, to divide the element end-face 606 into two. Terminal connecting parts 660, which protrude upward in the drawing, are formed on the centers of the current collector plates 618A and 618B. An element connecting part 662 is formed on the back side of each face next to each terminal connecting part 660. An isolation distance 664 is set between portions of the current collector plates 618A and 618B that face each other, as well as the above described isolation distance 610. Thereby, the current collector plates 618A and 618B are positioned in predetermined positions by the chuck part 666A and 666B of the current collector plate holder 650.

On the contrary, the capacitor element 604 is held by a holding table 668 of the element holder 646. This structure is to match the element center 612 of the capacitor element 604 with the center axis for holding the current collector plates 618A and 618B, to adjust the angular position of the capacitor element 604.

As described in the tenth embodiment, the baseline Lf and the center line Lo are calculated by the control unit 616 from the image 602, which is obtained by the photography of the element end-face 606 of the capacitor element 604. Thus, the shifting angle θ that shifts from a preset positioning angle for the current collector plates 618A and 618B is calculated. This shifting angle θ is used as correction information, and the holding table 668 of the element holder 646 is rotated. Thereby, the center line of the capacitor element 604 is matched with a position of the positioning angle Lθ (FIG. 18). In short, the angular difference is corrected, to complete the position setting.

The current collector plate 618A and the electrode part 620A, on which the position setting is carried out like the above, are connected by laser welding, and the current collector plate 618B and the electrode part 620B are also connected by laser welding. As to the laser welding, the top faces of the element connecting parts 662 of the current collector plates 618A and 618B are irradiated with a laser, and welding is carried out along weld lines 670 (FIG. 25) that radially extend from the element center 612 side to the circumference of the capacitor element 604.

Figure 25:
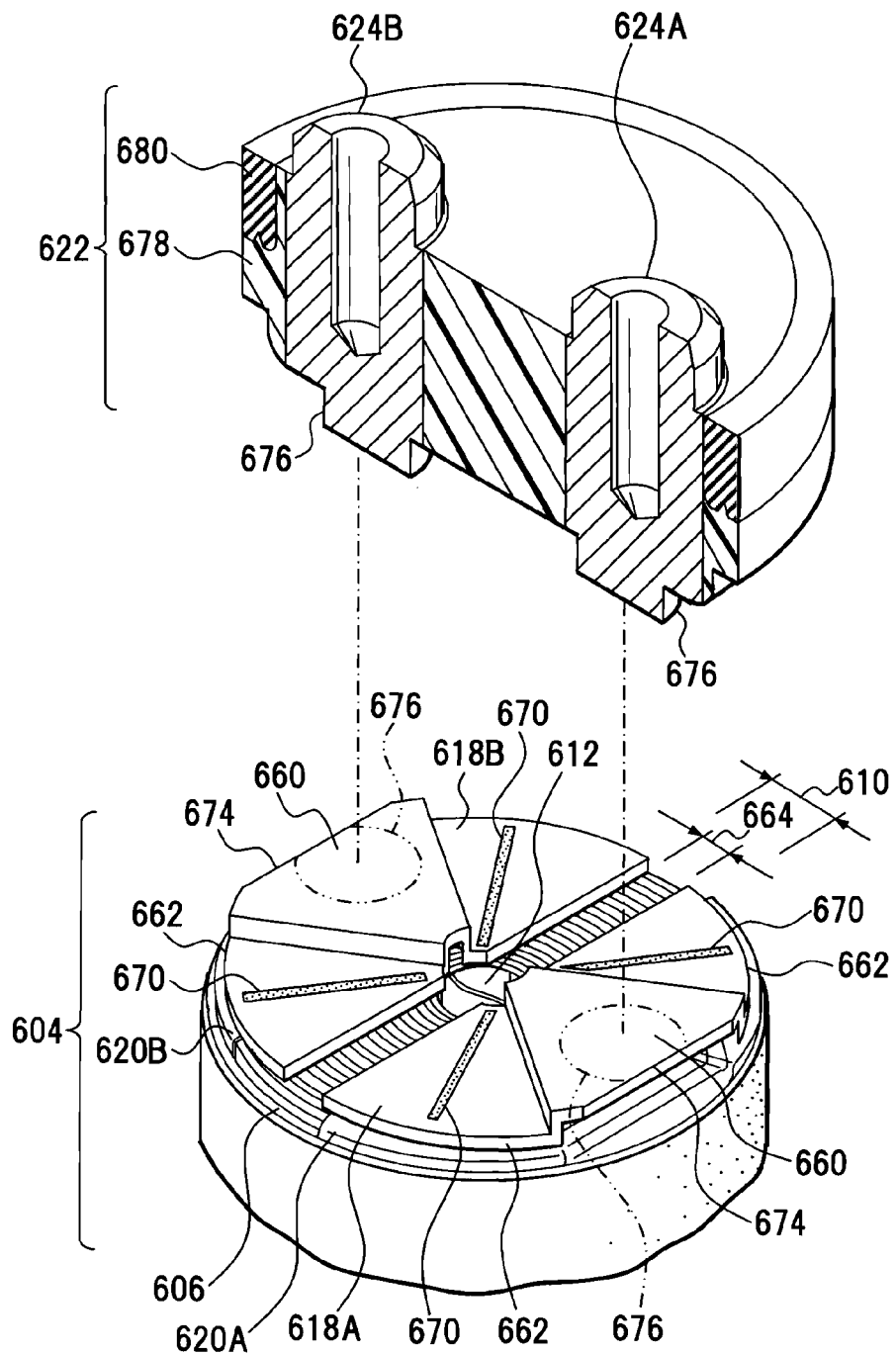
FIG. 25 is a perspective view depicting an example of connection between external terminals and the current collector plates.

FIG. 25 will be referred to concerning the connection between each current collector plate 618A and 618B, and an external terminal. FIG. 25 depicts a sealing plate and the capacitor element.

To the element end-face 606 of the capacitor element 604, as depicted in FIG. 25, the current collector plates 618A and 618B are connected by welding, using the above described process. The above described laser welding or electron beam welding are used for the connection. To the element connecting parts 662 of the current collector plate 618A, the electrode part 620A of the anode side of the capacitor element 604 is connected. To the element connecting parts 662 of the current collector plate 618B, the electrode part 620B of the cathode side of the capacitor element 604 is connected. The shapes of the current collector plates 618A and 618B are the same over the capacitor element 604 to which the current collector plates 618A and 618B are connected as the above. Under this condition, it is difficult to visually recognize polarities from the top of the current collector plates 618A and 618B. Thus, identification information is used for the connection with external terminals. This identification information represents which polarity each electrode protrusion part 608A and 608B of the capacitor element 604 has, based on the areas of the end-faces of the electrode protrusion parts 608A and 608B from image recognition of the electrode protrusion parts 608A and 608B. In short, identification information recognized in the connection with the capacitor element 604 may be used for polarities of the current collector plates 618A and 618B in the capacitor element 604 that is disposed on the holding table 668 of the element holder 646.

On the contrary, the anode terminal 624A and the cathode terminal 624B of external terminals in the sealing plate 622 are distinguished, to be characterized. Therefore, the anode terminal 624A is necessary to be connected to the electrode foil 654A of the anode side, that is, the electrode protrusion part 608A side, and the cathode terminal 624B is necessary to be connected to the electrode foil 654B of the cathode side, that is, the electrode protrusion part 608B side.

The current collector plate 618A is the anode side and the current collector plate 618B is the cathode side, both of which are over the capacitor element 604 that is positioned. Thus, the anode terminal 624A and the cathode terminal 624B that are in the sealing plate 622 are positioned on these current collector plates 618A and 618B. Then, a welded face 674 that is formed over the side face of the terminal connecting part 660 of each current collector plate 618A and 618B, and a welded face 676 that is formed over a side wall of the anode terminal 624A or the cathode terminal 624B are welded through irradiation with a laser by the laser irradiating device 652. Thereby, the anode terminal 624A or the cathode terminal 624B, and the capacitor element 604 are integrated, to be a single component. Moreover, the structure is realized that polarities of the capacitor element 604 side are matched with polarities of the sealing plate 622 side.

Identification information for polarity discrimination that is obtained using the image 602 of the element end-face 606 is used like the above. Thereby, visual polarity discrimination is not necessary till the connection with the anode terminal 624A in the sealing plate 622 and the connection with the cathode terminal 624B in the sealing plate 622. Using the above described identification information can automate polarity discrimination. Thereby, the polarity setting with high reliability without false recognition can be realized.

In the sealing plate 622 of this embodiment, the anode terminal 624A and the cathode terminal 624B are fixed by insert-molding for the main body 678 that is made from a hard resin plate. A sealing part 680 that is formed by elastic members of air-tightness such as rubber is disposed along the upper edge of the sealing plate 622. The anode terminal 624A of the anode side and the cathode terminal 624B of the cathode side are discriminated by their shapes and signs, which are not depicted.

As to the assembly of the capacitor and the capacitor itself in this embodiment, the capacitor is assembled by the same assembling step as described in the first embodiment. Thus, the description is omitted.

Twelfth Embodiment

A twelfth embodiment discloses a detection process of winding slippage of the capacitor element.

Figure 26:
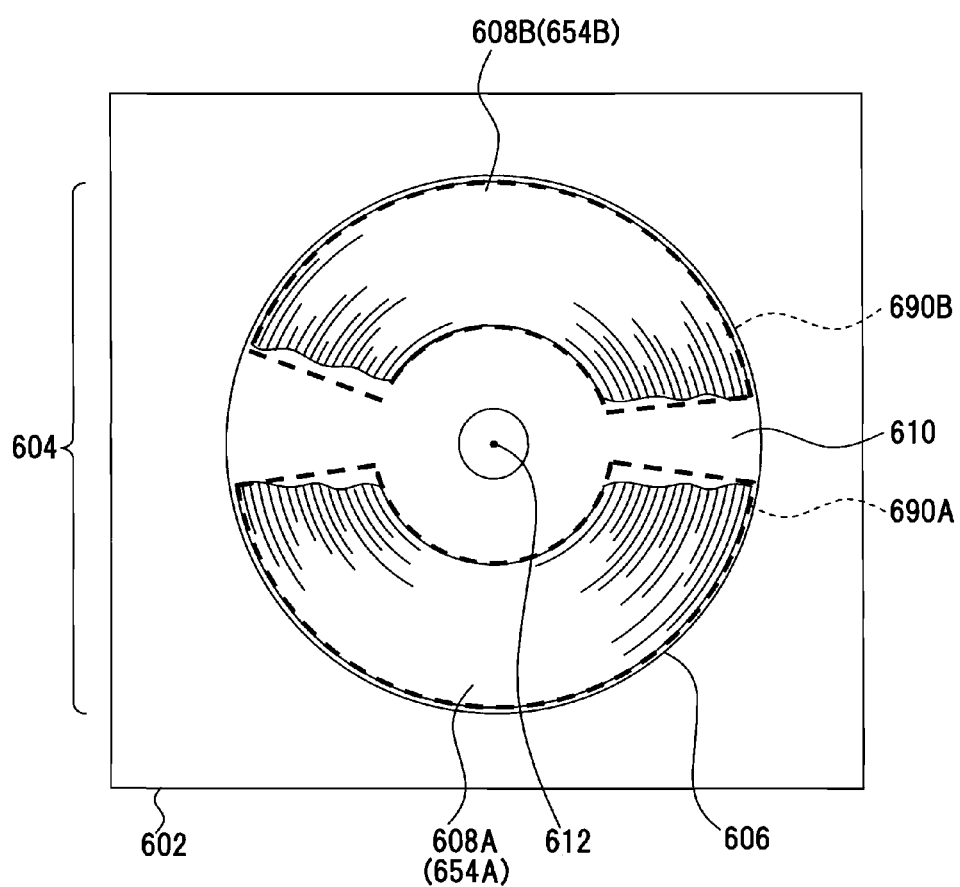
FIG. 26 depicts the detection of winding slippage according to the twelfth embodiment.

FIG. 26 will be referred to concerning this detection of winding slippage. FIG. 26 depicts an example of a detection process of winding slippage of the capacitor element.

The image 602 that is obtained in the tenth embodiment is used in this embodiment. Reference areas 690A and 690B are generated correspondingly to the areas of the shapes (detected areas) of the end faces of the electrode protrusion parts 608A and 608B that are over the element end-face 606 displayed on this image 602. The reference areas 690A and 690B may be stored in the data storage part 639 in advance, to be used by being read out from this data storage part 639. The reference areas 690A and 690B may be outline data representing their shapes, or may be area data.

The detected areas detected from the end-faces of the electrode protrusion parts 608A and 608B over the image 602, which is obtained, are compared with the reference areas 690A and 690B to determine whether the detected areas of the end-faces of the electrode protrusion parts 608A and 608B are within the reference areas 690A and 690B. If the detected area(s) stick(s) out of the reference area(s) 690A, 690B, winding slippage occurs in the capacitor element 604, and it is found out that the capacitor element 640 is a defective product.

According to such a structure, a defective product can be removed before the molding process of the electrode protrusion parts 608A and 608B. Thus, the reliability of a product can be improved.

Thirteenth Embodiment

Polarity discrimination is also necessary to connect current collectors and a capacitor element and to connect current collectors and external terminals. The work of polarity discrimination is trouble in the manufacture. It is possible to discriminate polarities by visual inspection. However, mistakes of the discrimination cannot be avoided, and it is difficult to realize the production that meets the demand. Connection under mistakes of polarity discrimination results in defective products. Such a problem is still applied even if the shapes of current collector members of the anode side and the cathode side are varied.

A thirteenth embodiment describes a process of defectiveness detection of electrode parts of the capacitor element.

Figure 27:
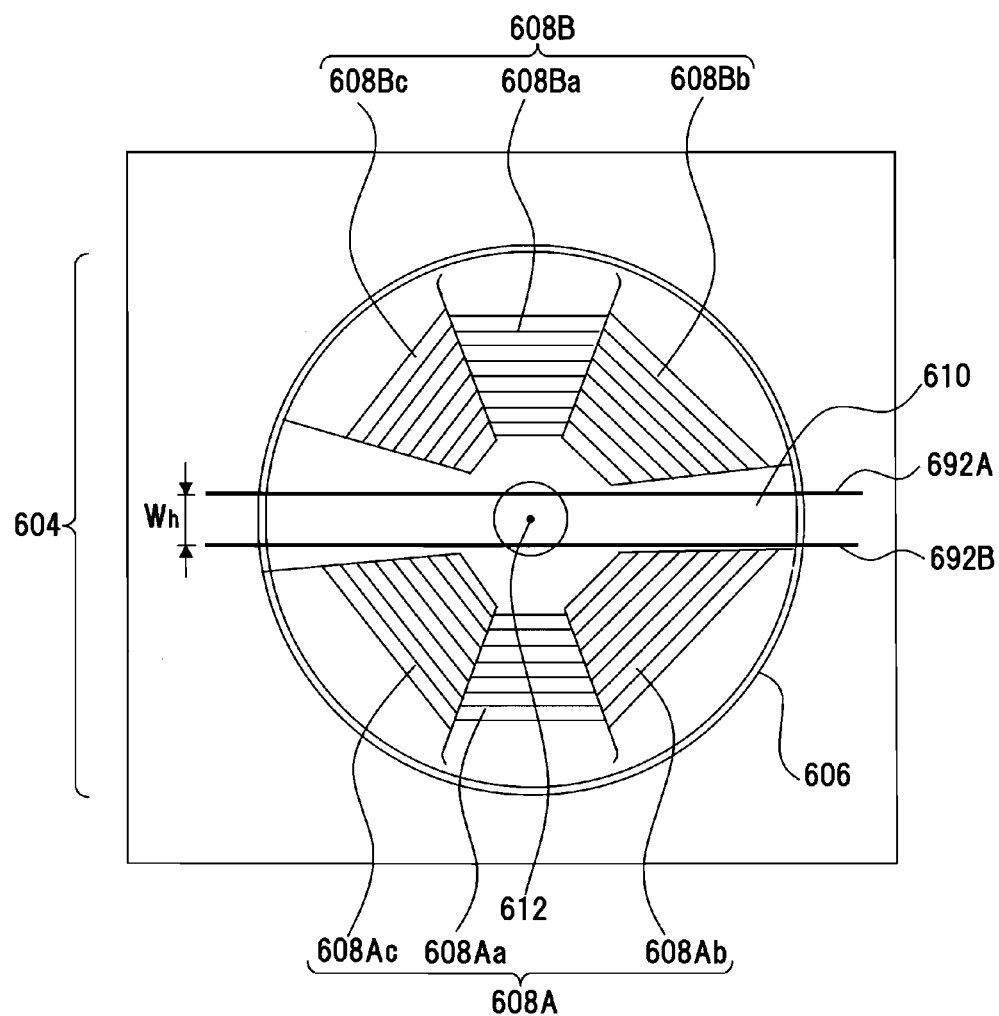
FIG. 27 depicts an example of defectiveness detection of electrode parts according to the thirteenth embodiment.

FIG. 27 will be referred to concerning this defectiveness detection of the electrode parts 620A and 620B. FIG. 27 depicts an example of defectiveness detection of the electrode parts.

In this embodiment, defectiveness detection of the electrode protrusion parts 608A and 608B after the molding process is carried out. The electrode protrusion parts 608A and 608B might be in contact with each other, depending on how the electrode protrusion parts 608A and 608B are molded.

Thus, the element end-face 606 of the capacitor element 604, which is molded over the electrode parts 620A and 620B, is photographed, and baselines 692A and 692B, the distance between which is constant width Wh, are generated along the isolation distance 610 on this element end-face 606 as depicted in FIG. 27. These baselines 692A and 692B may be generated based on the center line Lo that is calculated in the tenth embodiment. Parallel lines, the distance between which is the constant width Wh and which hold the element center 612 in the middle, may be generated based on the element center 612.

It is determined whether the electrode protrusion parts 608A and 608B stick into the width Wh between these baselines 692A and 692B. It can be detected whether the electrode protrusion parts 608A and 608B stick into the width Wh between the baselines 692A and 692B, using the contrast between a portion of higher brightness, which comes from the separators, and portions of lower brightness, which comes from metallic color of the electrode protrusion parts 608A and 608B. That is, it is determined whether either or both of the electrode protrusion parts 608A and 608B exist(s) within the width Wh. If either one or both of the electrode protrusion parts 608A and 608B exist(s) within the width Wh, it may be determined to be defective folding thereof. The capacitor element 604 in this case may be removed from a production line as a defective product. Thereby, the reliability of products can be improved.

Figure 9A:
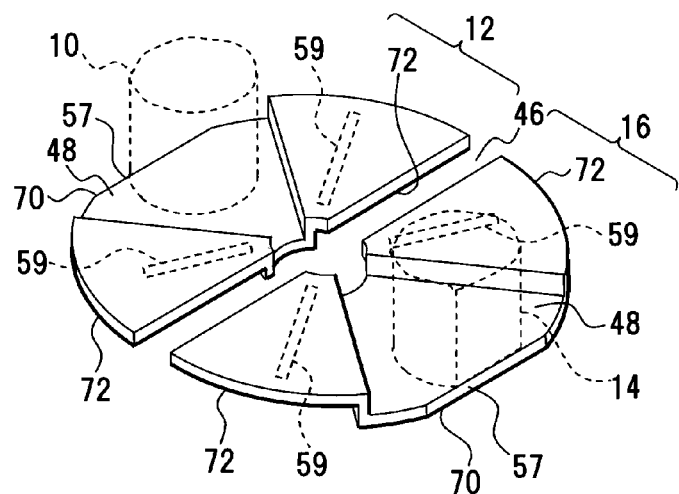
FIGS. 9A to 9C depict an example of an anode part, a cathode part and the current collector plates of the capacitor element according to other embodiments.

Other Embodiments (1) In the above embodiments, the flat element connecting parts 50 are formed on the anode current collector plate 12 and cathode current collector plate 16. For example, as depicted in FIG. 9A, a protruding face 70 that is a flat face, has an angle of 60 degrees, and protrudes over the capacitor element 4 side, and depression faces 72 which are backed and between which this protruding face 70 is sandwiched may be provided.

Figure 9B:
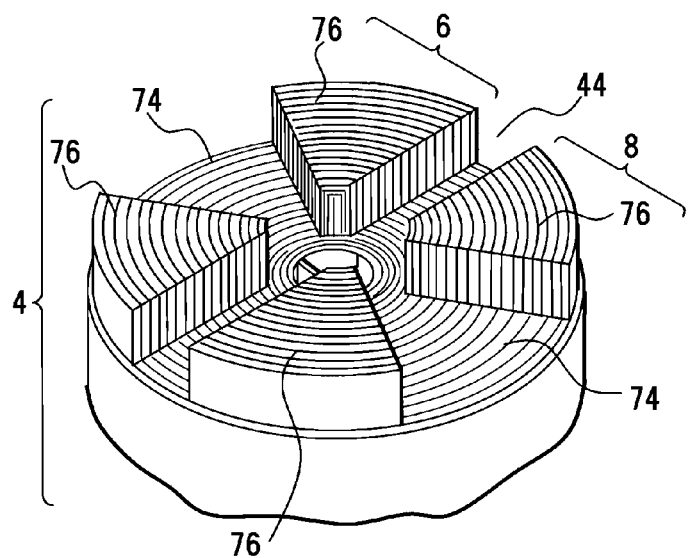
Figure 9C:
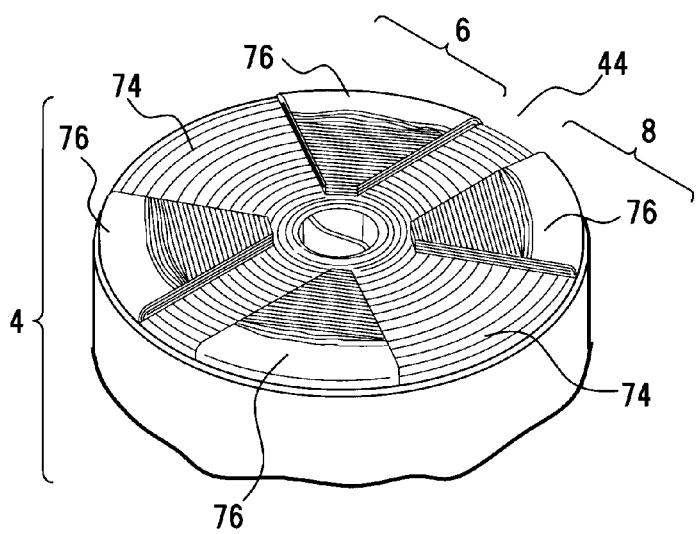

For example, as depicted in FIG. 9B, depressions 74 each of which has an angle of 60 degrees and is sunk, and protrusions 76 between which the depression 74 is sandwiched and which stick out, are provided for the anode part 6 and the cathode part 8 over the end-face of the capacitor element 4. The depressions 74 may be arranged in portions where the cathode part or the anode part is not formed. The protrusions 76 may be arranged in portions where compression molding toward the center of the capacitor element 4 is to be carried out. Compression molding toward the center of the capacitor element 4 is carried out on the protrusions 76 as depicted in FIG. 9C. As well as the above embodiments, the anode part 6 and the cathode part 8 may be respectively connected to the anode current collector plate 12 and the cathode current collector plate 16 by laser welding, to be unified.

(2) Only portions that correspond to laser welding parts (welded connecting parts 56) for the current collector plates 12 and 16 may be stuck out of the capacitor element 4; compression molding is carried out on these portions to flatten the portions; thus, the anode part 6 and the cathode part 8 are not formed over portions of the capacitor element 4 that correspond to connecting portions for external terminals (anode terminal 10 and cathode terminal 14). In the first embodiment, as depicted in FIG. 2, compression molding is carried out on the whole of the faces of the anode part 6 and the cathode part 8. However, portions that make a current collector plate (anode current collector plate 12 or cathode current collector plate 16), which is connected to an external terminal (anode terminal 10 or cathode terminal 14), abut on an external terminal without clearance and where laser welding for the anode part 6 and the current collector plate 12, and the cathode part 8 and the current collector plate 16 is not performed, may be intervened in a current collector plate.

(3) In the above embodiments, the capacitor 2 is exemplified. However, the present invention is not limited to this. The same structure and method can be applied to electrolytic capacitors as well, and the same effects can be obtained.

(4) In the first embodiment, the anode terminal 10 and the cathode terminal 14 are exemplified as terminal members. However, the present invention is not limited to this. As exemplified in the fourth embodiment, the anode connecting plate 62 and the cathode connecting plate 64 may be respectively used together with the anode terminal 10 and the cathode terminal 14.

(5) In the above embodiments, a wound element is used for the capacitor element 604. However, the present invention is not limited to this. A laminated element may be used.

(6) In the above embodiments, polarity discrimination is carried out based on the shapes or the areas of the end-faces of the electrode protrusion parts 608A and 608B that are drawn from the capacitor element 604. However, the present invention is not limited to this. Polarity discrimination may be carried out based on the shapes or the areas of the end-faces of the electrode parts 620A and 620B. The electrode parts 620A and 620B have molded faces that are formed by molding pressure acted on the electrode protrusion parts 608A and 608B that are drawn from the capacitor element 604. Also, molding pressure is acted on the electrode protrusion parts 608A and 608B that are drawn from the capacitor element 604, to form the electrode parts 620A and 620B over the molded faces. However, the present invention is not limited to this. The current collector plates 618A and 618B may be directly connected to the electrode protrusion parts 608A and 608B.

(7) In the above embodiments, the current collector plates 618A and 618B of the same shape are used for the anode side and the cathode side. However, the present invention is not limited to this. Their shapes or areas may be varied between the anode side and the cathode side. Also, the anode side or the cathode side may be identified by the shapes or the areas to connect to an external terminal.

According to the capacitor and the manufacturing method and manufacturing program of the capacitor disclosed in "DETAILED DESCRIPTION OF THE INVENTION", the following effects can be obtained.

(1) A current collector plate is individually provided between an anode part and an anode terminal member, and between a cathode part and a cathode terminal member. Then, the anode part and the cathode part that are drawn to one end-face of a wound capacitor element are connected with the anode terminal member and the cathode terminal member that are in an outer packaging material. Thus, reduction of the resistance of the capacitor element can be achieved.

(2) Structure of connecting an anode terminal member and a cathode terminal member that are in an outer packaging material, with an anode part and a cathode part that are drawn to one end-face of a wound capacitor element can be robust due to the connection structure of individually providing a current collector plate between the anode part and the anode terminal member, and between the cathode part and the cathode terminal member.

(3) According to the above structure, the connection between an anode terminal member and an anode part or the connection between a cathode terminal member and a cathode part can be simplified by interposing a current collector plate. Thus, the connecting steps can be achieved to be simplified.

(4) The shape or area of the end-face of an electrode protrusion part in the anode side that is over an element end-face of a capacitor element, or the shape or area of the end-face of an electrode part in the anode side that is formed from the electrode protrusion part is varied from that in the cathode side. Thus, the polarity discrimination can be carried out using the shape or area as identification information. Therefore, connection that the polarities concern can be rapidly made with high accuracy.

(5) Connection of a current collector plate and connection of an external terminal are made based on this polarity discrimination. Thus, connection of wrong polarities can be prevented, and automation of the connection can be achieved.

(6) The accuracy of the polarity discrimination can be improved. It is also possible to exactly position a capacitor element and a current collector plate, and moreover, to automate the positioning based on a baseline and center line that are identified at the same time with the polarity discrimination, and an element center.

(7) It can be determined whether an electrode protrusion part sticks into a reference range that is set on an element end-face based on a center line. Also, defective capacitor elements can be removed during the manufacture and automation of this removal can be achieved. Thus, the high-speed and low-cost manufacture can be achieved.

Technical ideas extracted from the embodiments including the example described above will then be listed. The technical ideas of the present disclosure may be comprehended at various levels and variations ranging from higher to lower conceptions and the present disclosure is not limited to the following description.

A capacitor that includes a case member and a capacitor element, the capacitor includes a capacitor element that is made by winding or laminating an anode body and a cathode body, between which a separator is sandwiched; a sealing member that seals an opening of the case member, which accommodates the capacitor element; an anode part that is drawn from the anode body of the capacitor element to an element end-face, to be formed over the element end-face; a cathode part that is drawn from the cathode body of the capacitor element to the element end-face, to be formed over the element end-face; an anode terminal member that is disposed in the sealing member; a cathode terminal member that is disposed in the sealing member; an anode current collector plate that is connected to the anode part, and is also connected to the anode terminal member; and a cathode current collector plate that is connected to the cathode part, and is also connected to the cathode terminal member.

In the above capacitor, preferably, the anode terminal member may be superposed on the anode current collector plate to weld side face parts of the anode terminal member and the anode current collector plate, or the cathode terminal member may be superposed on the cathode current collector plate to weld side face parts of the cathode terminal member and the cathode current collector plate.

In the above capacitor, preferably, connection by welding may be applied to either or both of connection between the anode current collector plate and a connecting part, which is provided for the anode terminal member and is adjacent to the anode current collector plate, and connection between the cathode current collector plate and a connecting part, which is provided for the cathode terminal member and is adjacent to the cathode current collector plate.

In the above capacitor, preferably, the anode part and the cathode part may be formed over one end-face of the capacitor element, and an isolation distance that isolates the anode part and the cathode part may be set.

In the above capacitor, preferably, compression molding toward a winding center of the capacitor element may be performed on the anode part or the cathode part over the element end-face, and the anode part may be welded to the anode current collector plate, which is arranged over a portion where the compression molding is performed, or the cathode part is welded to the cathode current collector plate, which is arranged over a portion where the compression molding is performed.

In the above capacitor, preferably, a single or a plurality of electrode protrusion part(s) may constitute the anode part or the cathode part, the electrode protrusion part(s) being drawn from one or both of electrode bodies, which include the anode body and the cathode body, to the element end-face of the capacitor element, the electrode protrusion part(s) being folded and superposed over the element end-face of the capacitor element along predetermined distance from the element end-face as a fold.

Preferably, the above capacitor may further include a connecting plate that is placed between the anode current collector plate and the anode terminal member, is connected to the anode terminal member, and is also connected to the anode current collector plate, or a connecting plate that is placed between the cathode current collector plate and the cathode terminal member, is connected to the cathode terminal member, and is also connected to the cathode current collector plate.

In the above capacitor, preferably, the anode part or the cathode part may be arranged over the element end-face of the capacitor element by drawing part of electrode bodies, which include the anode body and the cathode body, to the element end-face of the capacitor element and folding the part of the electrode bodies, the part of the electrode bodies having predetermined protruding width, and an isolation distance that is set between the anode part and the cathode part may be set wider than the protruding width of the electrode bodies.

In the above capacitor, preferably, an isolation distance that is set between the anode current collector plate and the cathode current collector plate may be narrower than an isolation distance that is set between the anode part and the cathode part.

In the above capacitor, preferably, if the capacitor element is a wound element, the anode part or the cathode part may be an electrode body that is bare from the element end-face of the capacitor element every other half a round, the electrode part having width narrower than arc length of a half round of the capacitor element.

In the above capacitor, preferably, the anode current collector plate may be placed between the anode part and the anode terminal member, a first connecting area and a second connecting area may be set in different positions on the anode current collector plate, the anode part may be connected to the first connecting area, and the anode terminal member may be connected to the second connecting area, or the cathode current collector plate may be placed between the cathode part and the cathode terminal member, the first connecting area and the second connecting area may be set in different positions on the cathode current collector plate, the cathode part may be connected to the first connecting area, and the cathode terminal member may be connected to the second connecting area.

In the above capacitor, preferably, one of the current collector plates may be placed over the element end-face of the capacitor element, be connected to the anode part or the cathode part, and have a first connecting face that is arcuate in a side face direction of the capacitor element, the anode terminal member or the cathode terminal member may have a second connecting face, which is concentric with the first connecting face of the current collector plate, and the first connecting face and the second connecting face may be welded to connect the current collector plate and the anode terminal member, or to connect the current collector plate and the cathode terminal member.

In the above capacitor, preferably, the current collector plate may include a cover that abuts on a first connecting face and covers the element end-face of the capacitor element.

In the above capacitor, preferably, each of the anode part and the cathode part may be formed by an electrode protrusion part that is drawn from the element end-face, a shape or an area of an end-face of the electrode protrusion part being varied between an anode side and a cathode side, or by molding the electrode protrusion part, to have a different shape or area of an end-face of each of the anode part and the cathode part, and the current collector plate may be identified as the anode side or the cathode side by the shape or the area of the end-face of the electrode protrusion part, or by the shape or the area of the end-face of the anode part or the cathode part.

In the above capacitor, preferably, the shape or the area of the current collector plate may be varied between the anode side and the cathode side, the anode side or the cathode side of the current collector plate may be identified by the shape or the area, and the current collector plate may be connected to the external terminal.

A capacitor manufacturing method includes forming a capacitor element that is made by winding or laminating an anode body and a cathode body, between which a separator is sandwiched; forming an anode part over an element end-face by being drawn from the anode body of the capacitor element; forming a cathode part on the element end-face by being drawn from the cathode body of the capacitor element; interposing an anode current collector plate between an anode terminal member that is disposed in a sealing member, which seals an opening of a case member accommodating the capacitor element, and the anode part, and connecting the anode terminal member and the anode part; and interposing a cathode current collector plate between a cathode terminal member that is disposed in the sealing member, and the cathode part, and connecting the cathode terminal member and the cathode part.

Preferably, the above capacitor manufacturing method may further include connecting the anode current collector plate and the anode part or connecting the cathode current collector plate and the cathode part, by laser welding; and connecting the anode current collector plate and the anode terminal member or connecting the cathode current collector plate and the cathode terminal member, by the laser welding.

Preferably, the above capacitor manufacturing method may further include setting a connecting part that is adjacent to the anode terminal member and the anode current collector plate to perform connection by the laser welding, or setting a connecting part that is adjacent to the cathode terminal member and the cathode current collector plate to perform connection by the laser welding.

Preferably, the above capacitor manufacturing method may further include superposing the anode terminal member on the anode current collector plate to weld side face parts of the anode terminal member and the anode current collector plate, or superposing the cathode terminal member on the cathode current collector plate to weld side wall face parts of the cathode terminal member and the cathode current collector plate.

Preferably, the above capacitor manufacturing method may further include positioning the side face part of the anode current collector plate on the side face part of the anode terminal member, or positioning the side face part of the cathode current collector plate on that of the cathode terminal member, wherein said welding may be carried out on the side face parts as a common face.

Preferably, the above capacitor manufacturing method may further include folding and superposing a single or a plurality of electrode protrusion part(s) over the element end-face of the capacitor element along a fold that is provided with predetermined distance from the element end-face, the electrode protrusion part(s) being drawn from one or both of the anode body and the cathode body to the element end-face of the capacitor element.

Preferably, the above capacitor manufacturing method may further include connecting the anode current collector plate to the anode part of the element end-face of the capacitor element or connecting the cathode current collector plate to the cathode part of the element end-face of the capacitor element, connecting a connecting plate to the anode terminal member or the cathode terminal member, and connecting the anode current collector plate or the cathode current collector plate to the connecting plate.

Preferably, the above capacitor manufacturing method may further include superposing a single or a plurality of the current collector plate(s) on a single or a plurality of electrode protrusion part(s) that is/are drawn from one or both of electrode bodies, which include the anode body and the cathode body, to the element end-face of the capacitor element, setting a weld line on the current collector plate(s), the weld line crossing the electrode bodies of the capacitor element, and welding along the weld line.

In the above capacitor manufacturing method, preferably, the weld lines that are at least two and are adjacent to each other may be set for each of a plurality of places on the current collector plates that face each other across an isolation distance, the weld lines that are at least two and are adjacent to each other in a particular place may be sequentially welded, the particular place being across an element center of the capacitor element, and after that, the weld lines that are at least two and are adjacent to each other in each of places other than the particular place may be sequentially welded, and the current collector plates and the electrode protrusion parts of the capacitor element may be welded along the weld lines that are at least two and are adjacent to each other in each of a plurality of the places.

Preferably, the above capacitor manufacturing method may further include setting a weld line that extends from a welding start point to a welding end point in the anode current collector plate or the cathode current collector plate, and connecting the anode current collector plate to the anode part or connecting the cathode current collector plate to the cathode part, by irradiation with a beam, the weld line being sequentially irradiated with the beam, the power of the beam being sequentially varied step by step.

In the above capacitor manufacturing method, preferably, the power of the beam at the welding start point of the weld line may be set higher than that at the welding end point of the weld line, and may be attenuated step by step or sequentially from the welding start point to the welding end point.

Preferably, the above capacitor manufacturing method may further include forming a first connecting face on the current collector plate that is placed on the element end-face of a capacitor element to be connected to an anode side or a cathode side, the first connecting face being arcuate in a side face direction of the capacitor element; forming a second connecting face on a terminal member that is connected to the current collector plate, the second connecting face being concentric with the first connecting face; placing the first connecting face and the second connecting face side by side, and using the capacitor element or a welding means that irradiates the first connecting face and the second connecting face with a beam to rotationally move the capacitor element or the welding means; and welding the first connecting face and the second connecting face to connect the current collector plate and the terminal member.

In the above capacitor manufacturing method, preferably, the first connecting face and the second connecting face may be formed so as to be concentric based on an element center of the capacitor element, and the capacitor element or the welding means may be rotationally moved around the element center as a rotation center.

In the above capacitor manufacturing method, preferably, each of the anode part and the cathode part may be formed by forming an electrode protrusion part of an anode side or a cathode side over the element end-face, an shape or an area of an end-face of the electrode protrusion part being different between the anode side and the cathode side, or by molding the electrode protrusion part that is formed over the element end-face, to have a different shape or area of an end-face of each of the anode part and the cathode part, the capacitor manufacturing method further including: discriminating between the anode side and the cathode side, using the shape or the area of the end-face of the electrode protrusion part, or the shape or the area of the end-face of the anode part or the cathode part, as identification information; and identifying the current collector plate as the anode side or the cathode side by the identification information, and the anode terminal member or the cathode terminal member may be connected to the current collector plate that is identified as the anode side or the cathode side.

Preferably, the above capacitor manufacturing method may further include recognizing the electrode protrusion part, or the anode part or cathode part, to set a baseline on the element end-face, setting a center line that is parallel to the baseline and passes through an element center; detecting a displacing angle of the element end-face based on the element center and the center line; and correcting an angular position of the capacitor element by correction information that is generated by the displacing angle.

Preferably, the above capacitor manufacturing method may further include setting a reference range of constant width that uses the center line as its center, the center line being within the reference range, and determining whether the electrode protrusion part or the electrode part sticks into the reference range.

A capacitor manufacturing program which is executed by a computer includes obtaining image data of an element end-face of a capacitor element, and discriminating between an anode side and a cathode side, using a shape or an area of an end-face of an electrode protrusion part or an electrode part that is formed by the electrode protrusion part as identification information; and generating information of identifying an external terminal as the anode side or the cathode side, the external terminal being connected to a current collector plate that is connected to the electrode protrusion part or the electrode part.

Preferably, the above capacitor manufacturing program may further include generating a baseline based on a position of the electrode protrusion part or the electrode part on the image data; generating a center line that is parallel to the baseline and passes through an element center; detecting a displacing angle of the element end-face based on the element center and the center line; and generating correction information of an angular position of the capacitor element by the displacing angle.

Preferably, the above capacitor manufacturing program may further include setting a reference range of constant width that uses the center line as its center, the center line being within the reference range, determining whether the electrode protrusion part or the electrode part sticks into the reference range, and generating information on said determining.

In the disclosed embodiments, the processing can be accomplished by a computer-executable program, and this program can be realized in a computer-readable memory device.

In the embodiments, the memory device, such as a magnetic disc, a flexible disk, a hard disk, an optical disk (CD-ROM, CD-R, DVD, and so on), an optical magnetic disk (MD and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devises may be included in the memory device. The component of the device may be arbitrarily composed.

A computer may execute each processing state of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The capacitor, and the manufacturing method and the manufacturing program of the capacitor of the present invention contribute to the production because of the simplification of terminal connection structures and connecting steps, or the automation of polarity discrimination. Thus, the productivity and reliability can be improved, and thus the present invention is useful.

What is claimed is:

1. A capacitor that includes a case member and a capacitor element, the capacitor comprising:
    a capacitor element that is made by winding or laminating an anode body and a cathode body, between which a separator is sandwiched;
    a sealing member that seals an opening of the case member, which accommodates the capacitor element;
    an anode part that is drawn from the anode body of the capacitor element to an element end-face, to be formed over the element end-face;
    a cathode part that is drawn from the cathode body of the capacitor element to the element end-face, to be formed over the element end-face;
    an anode terminal member that is disposed in the sealing member;
    a cathode terminal member that is disposed in the sealing member;
    an anode current collector plate that is connected to the anode part, and is also connected to the anode terminal member; and
    a cathode current collector plate that is connected to the cathode part, and is also connected to the cathode terminal member.

2. The capacitor of claim 1, wherein
    the anode terminal member is superposed on the anode current collector plate to weld side face parts of the anode terminal member and the anode current collector plate, or the cathode terminal member is superposed on the cathode current collector plate to weld side face parts of the cathode terminal member and the cathode current collector plate.

3. The capacitor of claim 1, wherein
    a single or a plurality of electrode protrusion part(s) constitute(s) the anode part or the cathode part, the electrode protrusion part(s) being drawn from one or both of electrode bodies, which include the anode body and the cathode body, to the element end-face of the capacitor element, the electrode protrusion part(s) being folded and superposed over the element end-face of the capacitor element along predetermined distance from the element end-face as a fold.

4. The capacitor of claim 1, further comprising:
    a connecting plate that is placed between the anode current collector plate and the anode terminal member, is connected to the anode terminal member, and is also connected to the anode current collector plate, or a connecting plate that is placed between the cathode current collector plate and the cathode terminal member, is connected to the cathode terminal member, and is also connected to the cathode current collector plate.

5. The capacitor of claim 1, wherein
    the anode part or the cathode part is arranged over the element end-face of the capacitor element by drawing part of electrode bodies, which include the anode body and the cathode body, to the element end-face of the capacitor element and folding the part of the electrode bodies, the part of the electrode bodies having predetermined protruding width, and an isolation distance that is set between the anode part and the cathode part is set wider than the protruding width of the electrode bodies.

6. The capacitor of claim 1, wherein
    an isolation distance that is set between the anode current collector plate and the cathode current collector plate is narrower than an isolation distance that is set between the anode part and the cathode part.

7. The capacitor of claim 1, wherein
the anode current collector plate is placed between the anode part and the anode terminal member, a first connecting area and a second connecting area are set in different positions on the anode current collector plate, the anode part is connected to the first connecting area, and the anode terminal member is connected to the second connecting area, or the cathode current collector plate is placed between the cathode part and the cathode terminal member, the first connecting area and the second connecting area are set in different positions on the cathode current collector plate, the cathode part is connected to the first connecting area, and the cathode terminal member is connected to the second connecting area.

8. The capacitor of claim 1, wherein
one of the current collector plates is placed over the element end-face of the capacitor element, is connected to the anode part or the cathode part, and has a first connecting face that is arcuate in a side face direction of the capacitor element,
the anode terminal member or the cathode terminal member has a second connecting face, which is concentric with the first connecting face of the current collector plate, and
the first connecting face and the second connecting face are welded to connect the current collector plate and the anode terminal member, or to connect the current collector plate and the cathode terminal member.

9. The capacitor of claim 1, wherein
each of the anode part and the cathode part is formed by an electrode protrusion part that is drawn from the element end-face, a shape or an area of an end-face of the electrode protrusion part being varied between an anode side and a cathode side, or by molding the electrode protrusion part, to have a different shape or area of an end-face of each of the anode part and the cathode part, and
the current collector plate is identified as the anode side or the cathode side by the shape or the area of the end-face of the electrode protrusion part, or by the shape or the area of the end-face of the anode part or the cathode part.

10. The capacitor of claim 9, wherein
the shape or the area of the current collector plate is varied between the anode side and the cathode side, the anode side or the cathode side of the current collector plate is identified by the shape or the area, and the current collector plate is connected to the external terminal.

11. A capacitor manufacturing method comprising:
forming a capacitor element that is made by winding or laminating an anode body and a cathode body, between which a separator is sandwiched;
forming an anode part over an element end-face by being drawn from the anode body of the capacitor element;
forming a cathode part on the element end-face by being drawn from the cathode body of the capacitor element;
interposing an anode current collector plate between an anode terminal member that is disposed in a sealing member, which seals an opening of a case member accommodating the capacitor element, and the anode part, and connecting the anode terminal member and the anode part; and
interposing a cathode current collector plate between a cathode terminal member that is disposed in the sealing member, and the cathode part, and connecting the cathode terminal member and the cathode part.

12. The capacitor manufacturing method of claim 11, further comprising:
superposing the anode terminal member on the anode current collector plate to weld side face parts of the anode terminal member and the anode current collector plate, or superposing the cathode terminal member on the cathode current collector plate to weld side wall face parts of the cathode terminal member and the cathode current collector plate.

13. The capacitor manufacturing method of claim 12, further comprising:
positioning the side face part of the anode current collector plate on the side face part of the anode terminal member, or positioning the side face part of the cathode current collector plate on that of the cathode terminal member,
wherein said welding is carried out on the side face parts as a common face.

14. The capacitor manufacturing method of claim 11, further comprising:
superposing a single or a plurality of the current collector plate(s) on a single or a plurality of electrode protrusion part(s) that is/are drawn from one or both of electrode bodies, which include the anode body and the cathode body, to the element end-face of the capacitor element, setting a weld line on the current collector plate(s), the weld line crossing the electrode bodies of the capacitor element, and welding along the weld line.

15. The capacitor manufacturing method of claim 11, further comprising:
setting a weld line that extends from a welding start point to a welding end point in the anode current collector plate or the cathode current collector plate, and connecting the anode current collector plate to the anode part or connecting the cathode current collector plate to the cathode part, by irradiation with a beam, the weld line being sequentially irradiated with the beam, the power of the beam being sequentially varied step by step.

16. The capacitor manufacturing method of claim 15, wherein
the power of the beam at the welding start point of the weld line is set higher than that at the welding end point of the weld line, and is attenuated step by step or sequentially from the welding start point to the welding end point.

17. The capacitor manufacturing method of claim 11, further comprising:
forming a first connecting face on the current collector plate that is placed on the element end-face of the capacitor element to be connected to an anode side or a cathode side, the first connecting face being arcuate in a side face direction of the capacitor element;
forming a second connecting face on the anode terminal member or the cathode terminal member that is connected to the current collector plate, the second connecting face being concentric with the first connecting face;
placing the first connecting face and the second connecting face side by side, and using the capacitor element or a welding means that irradiates the first connecting face and the second connecting face with a beam to rotationally move the capacitor element or the welding means; and
welding the first connecting face and the second connecting face to connect the current collector plate and the anode terminal member or the cathode terminal member.

18. The capacitor manufacturing method of claim 17, wherein
- the first connecting face and the second connecting face are formed so as to be concentric based on an element center of the capacitor element, and
- the capacitor element or the welding means is rotationally moved around the element center as a rotation center.

19. The capacitor manufacturing method of claim 11, wherein
- each of the anode part and the cathode part is formed by forming an electrode protrusion part of an anode side or a cathode side over the element end-face, an shape or an area of an end-face of the electrode protrusion part being different between the anode side and the cathode side, or by molding the electrode protrusion part that is formed over the element end-face, to have a different shape or area of an end-face of each of the anode part and the cathode part, and
- the capacitor manufacturing method further comprising:
  - discriminating between the anode side and the cathode side, using the shape or the area of the end-face of the electrode protrusion part, or the shape or the area of the end-face of the anode part or the cathode part, as identification information; and
  - identifying the current collector plate as the anode side or the cathode side by the identification information, wherein
- the anode terminal member or the cathode terminal member is connected to the current collector plate that is identified as the anode side or the cathode side.

20. The capacitor manufacturing method of claim 19, further comprising:
- recognizing the electrode protrusion part, or the anode part or cathode part, to set a baseline on the element end-face;
- setting a center line that is parallel to the baseline and passes through an element center;
- detecting a displacing angle of the element end-face based on the element center and the center line; and
- correcting an angular position of the capacitor element by correction information that is generated by the displacing angle.

* * * * *